(12) United States Patent
Cong et al.

(10) Patent No.: US 12,527,630 B2
(45) Date of Patent: Jan. 20, 2026

(54) ULTRASOUND SYSTEM AND METHOD FOR PLANNING ABLATION

(71) Applicants: SHENZHEN MINDRAY BIO-MEDICAL ELECTRONICS CO., LTD., Guangdong (CN); BEIJING SHEN MINDRAY MEDICAL ELECTRONICS TECHNOLOGY RESEARCH INSTITUTE CO., LTD, Beijing (CN)

(72) Inventors: Longfei Cong, Beijing (CN); Yanhui Zhang, Beijing (CN); Maodong Sang, Beijing (CN)

(73) Assignees: Shenzhen Mindray Bio-Medical Electronics Co., Ltd, Shenzhen (CN); Beijing Shen Mindray Medical Electronics Technology Research Institute Co., Ltd., Beijing (CN)

( * ) Notice: Subject to any disclaimer, the term of this patent is extended or adjusted under 35 U.S.C. 154(b) by 102 days.

(21) Appl. No.: 16/879,732

(22) Filed: May 20, 2020

(65) Prior Publication Data
US 2020/0281662 A1 Sep. 10, 2020

Related U.S. Application Data

(63) Continuation of application No. PCT/CN2017/112174, filed on Nov. 21, 2017.

(51) Int. Cl.
A61B 34/00 (2016.01)
A61B 5/00 (2006.01)
(Continued)

(52) U.S. Cl.
CPC ............ A61B 34/20 (2016.02); A61B 5/0035 (2013.01); A61B 5/055 (2013.01); A61B 5/062 (2013.01);
(Continued)

(58) Field of Classification Search
CPC ....... A61B 34/20; A61B 5/0035; A61B 5/055; A61B 5/062; A61B 6/032; A61B 6/5247;
(Continued)

(56) References Cited

U.S. PATENT DOCUMENTS 7,452,357 B2  11/2008  Vlegele et al.
9,144,461 B2   9/2015  Kruecker et al.
(Continued)

FOREIGN PATENT DOCUMENTS

CN   1788693 A  *  6/2006  ............. A61B 90/10
CN   1805711 A     7/2006
(Continued)

OTHER PUBLICATIONS

PCT International Search Report and the Written Opinion mailed Aug. 13, 2018, issued in related International Application No. PCT/CN2017/112174, with partial English translation (13 pages).
(Continued)

Primary Examiner — Michael J Carey
Assistant Examiner — Zainab Mohammed Aldarraji
(74) Attorney, Agent, or Firm — Sheppard Mullin Richter & Hampton LLP

(57) ABSTRACT

An system and method for planning ablation are provided. The method includes: obtaining a real-time ultrasound image of an examined object containing a target tissue through an ultrasound probe; obtaining a spatial orientation information of a positioning device fixed on the ultrasound probe; obtaining a three-dimensional model data of the target tissue; registering the three-dimensional model data with the real-time ultrasound image data according to the spatial orientation information to obtain a mapping relationship between the three-dimensional model data and the real-time ultrasound image data; displaying the real-time ultrasound images and a view data obtained according to the
(Continued)

three-dimensional model data registered with the real-time ultrasound image in a fusion manner according to the mapping relationship to obtain a fusion image; and determining a planned ablation path according to the fusion image.

20 Claims, 7 Drawing Sheets

(51) Int. Cl.
A61B 5/055 (2006.01)
A61B 5/06 (2006.01)
A61B 6/00 (2006.01)
A61B 6/03 (2006.01)
A61B 8/00 (2006.01)
A61B 8/08 (2006.01)
A61B 34/20 (2016.01)
G06T 19/00 (2011.01)

(52) U.S. Cl.
CPC ............ *A61B 6/032* (2013.01); *A61B 6/5247* (2013.01); *A61B 8/0841* (2013.01); *A61B 8/463* (2013.01); *A61B 8/466* (2013.01); *A61B 8/481* (2013.01); *A61B 8/485* (2013.01); *A61B 34/25* (2016.02); *G06T 19/003* (2013.01); *A61B 2034/2063* (2016.02); *G06T 2210/41* (2013.01)

(58) Field of Classification Search
CPC ....... A61B 8/0841; A61B 8/463; A61B 8/466; A61B 8/481; A61B 8/485; A61B 34/25; A61B 2034/2063; A61B 8/085; A61B 8/4254; A61B 8/5246; A61B 2017/3413; A61B 17/3403; A61B 2034/101; A61B 2034/105; A61B 2034/107; A61B 2034/2051; A61B 2090/364; A61B 5/684; A61B 34/10; A61B 5/6835; A61B 2505/05; A61B 2576/00; A61B 18/12; G06T 19/003; G06T 2210/41; G06T 19/00
See application file for complete search history.

(56) References Cited

U.S. PATENT DOCUMENTS

| 10,070,846 B2 | 9/2018 | Jago et al. | |
|---|---|---|---|
| 2007/0049827 A1 | 3/2007 | Donaldson | |
| 2007/0239150 A1 | 10/2007 | Zvuloni et al. | |
| 2014/0058387 A1* | 2/2014 | Kruecker | G16H 50/50 606/41 |
| 2014/0228835 A1* | 8/2014 | Mielekamp | A61B 34/25 606/34 |
| 2015/0173619 A1* | 6/2015 | Zvuloni | A61B 10/0275 600/425 |
| 2016/0374646 A1 | 12/2016 | Case et al. | |
| 2018/0042679 A1* | 2/2018 | Dalal | A61B 18/12 |
| 2020/0138516 A1 | 5/2020 | Girotto et al. | |
| 2020/0360073 A1 | 11/2020 | Govari et al. | |
| 2021/0007805 A1 | 1/2021 | Liu et al. | |

FOREIGN PATENT DOCUMENTS

| CN | 100484491 C | * | 5/2009 | |
|---|---|---|---|---|
| CN | 102238921 A | * | 11/2011 | ............ A61B 18/18 |
| CN | 102512246 A | * | 6/2012 | |
| CN | 102652690 A | | 9/2012 | |
| CN | 202636984 U | | 1/2013 | |
| CN | 103717167 A | | 4/2014 | |
| CN | 104605926 A | | 5/2015 | |
| CN | 104822326 A | | 8/2015 | |
| CN | 105286988 A | | 2/2016 | |
| CN | 105534593 A | * | 5/2016 | |
| CN | 106539624 A | * | 3/2017 | ............ A61B 34/20 |
| CN | 106606374 A | | 5/2017 | |
| CN | 106691580 A | | 5/2017 | |
| EP | 2713888 A1 | | 4/2014 | |
| JP | H04-17846 A | | 1/1992 | |
| WO | 2012/166239 A1 | | 12/2012 | |
| WO | 2013/052318 A1 | | 4/2013 | |
| WO | WO-2015039302 A1 | * | 3/2015 | ........... A61B 8/4254 |
| WO | WO-2015051622 A1 | * | 4/2015 | ........... A61B 8/5261 |
| WO | 2015/092628 A1 | | 6/2015 | |

OTHER PUBLICATIONS

First Search dated Feb. 22, 2022, issued in related Chinese Application No. 201780094613.8 (4 pages).
PCT International Preliminary Report on Patentability mailed Jun. 4, 2020, issued in related International Application No. PCT/CN2017/112174, with English translation (12 pages).

* cited by examiner

ULTRASOUND SYSTEM AND METHOD FOR PLANNING ABLATION

CROSS REFERENCE TO RELATED APPLICATION

The present application is a continuation of International Application No. PCT/CN2017/112174, filed with the China National Intellectual Property Administration on Nov. 21, 2017 and entitled "Ultrasonic System and Method for Planning Ablation", which is incorporated herein by reference in its entirety.

TECHNICAL FIELD

The present disclosure relates to a simulation intervention guidance device based on medical ultrasound imaging system and a simulation effect evaluation method.

BACKGROUND

In order to treat cancer, the tumor tissue in the human body must be removed or killed. The conventional resection surgery may cause great damage to the human body, and many patients cannot undergo the resection surgery. Due to the advancement of imaging technologies and the rapid development of minimally invasive intervention equipments, image-guided interventional therapy, especially ultrasound-guided interventional ablation therapy, has become one of the most important clinical treatments for tumors. Currently commonly used interventional ablation methods include radio frequency ablation (RFA), microwave ablation, laser ablation and cryoablation. These ablation methods all kill cells in the tumor area of the body through minimally invasive interventions. However, due to the limitations of the ablation method, each interventional ablation needle can only kill tumor cells in a limited area. In the case that the tumor is large or there are multiple tumors discretely distributed, multiple needles or repeated needle ablation is required. In order to ensure the accurate killing of tumor cells without or with less damage to the normal tissues, it is desired to plan the path of the ablation needle and simulate the operation in advance so as to perform a preoperative evaluation and verification for the desired ablation area.

The interventional ablation surgery planning has been proposed for a long time. However, the current interventional surgery planning is based on CT, MRI or three-dimensional ultrasound and other three-dimensional data. For example, the three-dimensional segmentation and extraction and three-dimensional reconstruction and display of human tissues such as tumors and blood vessels, etc. may be performed based on the three-dimensional data of the human body, and the ablation needle path may be set according to the processed medical image information. In another method, an image-guided surgery planning device is proposed, in which the ablation needle entry point, angle, depth, power and ablation duration, etc. are manually set based on the three-dimensional image of the patient, the temperature field is calculated based on the input microwave energy, and the three-dimensional temperature field and the three-dimensional image of the patient are displayed in a fusion manner. In addition, in another method, ablation treatment planning methods and equipments are provided, in which MPR display technologies are used to display the three-dimensional images and the section of the three-dimensional model data of the ablation volumes. The planning methods above are based on the static three-dimensional data acquired before the surgery, and the path planned according to such data is very different from the actual clinical intervention operation. In the actual interventional treatment process, due to the influence of ribs and other human tissues, the needle cannot be accurately inserted according to the planned path, which will inevitably affect the effect of ablation treatment and increase the risk of surgical treatment.

SUMMARY

Therefore, it is desired to provide an ultrasound system and an evaluation method for planning ablation to address the issues in the prior art.

In one embodiment, an ultrasound system for planning ablation is provided, which may include:
an ultrasound probe;
a transmitting circuit which excites the ultrasound probe to transmit an ultrasound beam to an examined object containing a target tissue;
a receiving circuit which receives echoes of the ultrasound beam to obtain an ultrasound echo signal;
a navigation system comprising a positioning device fixed on the ultrasound probe;
a display screen;
a memory which stores a computer program; and
a processor which, when executing the program:
obtains a real-time ultrasound image data of the examined object according to the ultrasound echo signal;
obtains a spatial orientation information of the positioning device through the navigation system;
obtains a three-dimensional model data of the target tissue;
registers the three-dimensional model data with the real-time ultrasound image data according to the spatial orientation information;
displays the real-time ultrasound image data and a view data obtained according to the three-dimensional model data registered with the real-time ultrasound image on the display screen in a fusion manner to obtain a fusion image; and
determines a planned ablation path according to the fusion image.

In one embodiment, an ultrasound imaging method for planning ablation is provided, which may include:
obtain a real-time ultrasound image of an examined object containing a target tissue through an ultrasound probe;
obtaining a spatial orientation information of a positioning device fixed on the ultrasound probe;
obtaining a three-dimensional model data of the target tissue;
registering the three-dimensional model data with the real-time ultrasound image data according to the spatial orientation information;
displaying the real-time ultrasound images and a view data obtained according to the three-dimensional model data registered with the real-time ultrasound image in a fusion manner to obtain a fusion image; and
determining a planned ablation path according to the fusion image.

In one embodiment, an ultrasound system is provided, which may include:
an ultrasound probe;
an ablation device fixed on the ultrasound probe;
a transmitting circuit which excites the ultrasound probe to transmit an ultrasound beam to an examined object containing a target tissue;

a receiving circuit which receives echoes of the ultrasound beam to obtain an ultrasound echo signal;

a navigation system comprising a positioning device fixed on the ultrasound probe;

a display screen;

a memory storing a computer program; and a processor which, when executing the program:

obtains a real-time ultrasound image data of the examined object according to the ultrasound echo signal;

obtains a spatial orientation information of the positioning device through the navigation system;

displays the real-time ultrasound image data on the display screen;

obtains an actual ablation path of the ablation device according to the real-time ultrasound image data and the spatial orientation information;

obtains a pre-stored planned ablation path;

displays the planned ablation path on the real-time ultrasound image data;

displays the actual ablation path on the real-time ultrasound image data.

DETAILED DESCRIPTION

The present disclosure will be described in detail below through specific embodiments and drawings. Similar elements in different embodiments will be designated with similar reference numbers. In the following embodiments, many details are described so that the present disclosure can be better understood. However, those skilled in the art can easily recognize that some of the features can be omitted in different situations, or can be replaced by other elements, materials, or methods. In some cases, some operations related to the present disclosure are not shown or described in the specification so as to avoid the core part of the present disclosure being overwhelmed by too many descriptions. For those skilled in the art, the detailed description of these operations is not necessary. They can fully understand these operations according to the description herein and the general technical knowledge in the field.

In addition, the features, operations or characteristics described herein may be combined in any appropriate manner to form various embodiments. Moreover, the steps or actions in the described methods may also be changed or adjusted in the order in a manner obvious to those skilled in the art. Therefore, the orders in the specification and the drawings are only for clearly describing a certain embodiment, but not mean a necessary order, unless otherwise stated that a certain order must be followed.

In the present disclosure, the serial numbers themselves, such as "first", "second", etc., are used to distinguish the described objects, but do not have any order or technical meaning. The "connection" and "coupling" mentioned in the present disclosure, unless otherwise specified, will include direct and indirect connection (coupling).

Figure 1:
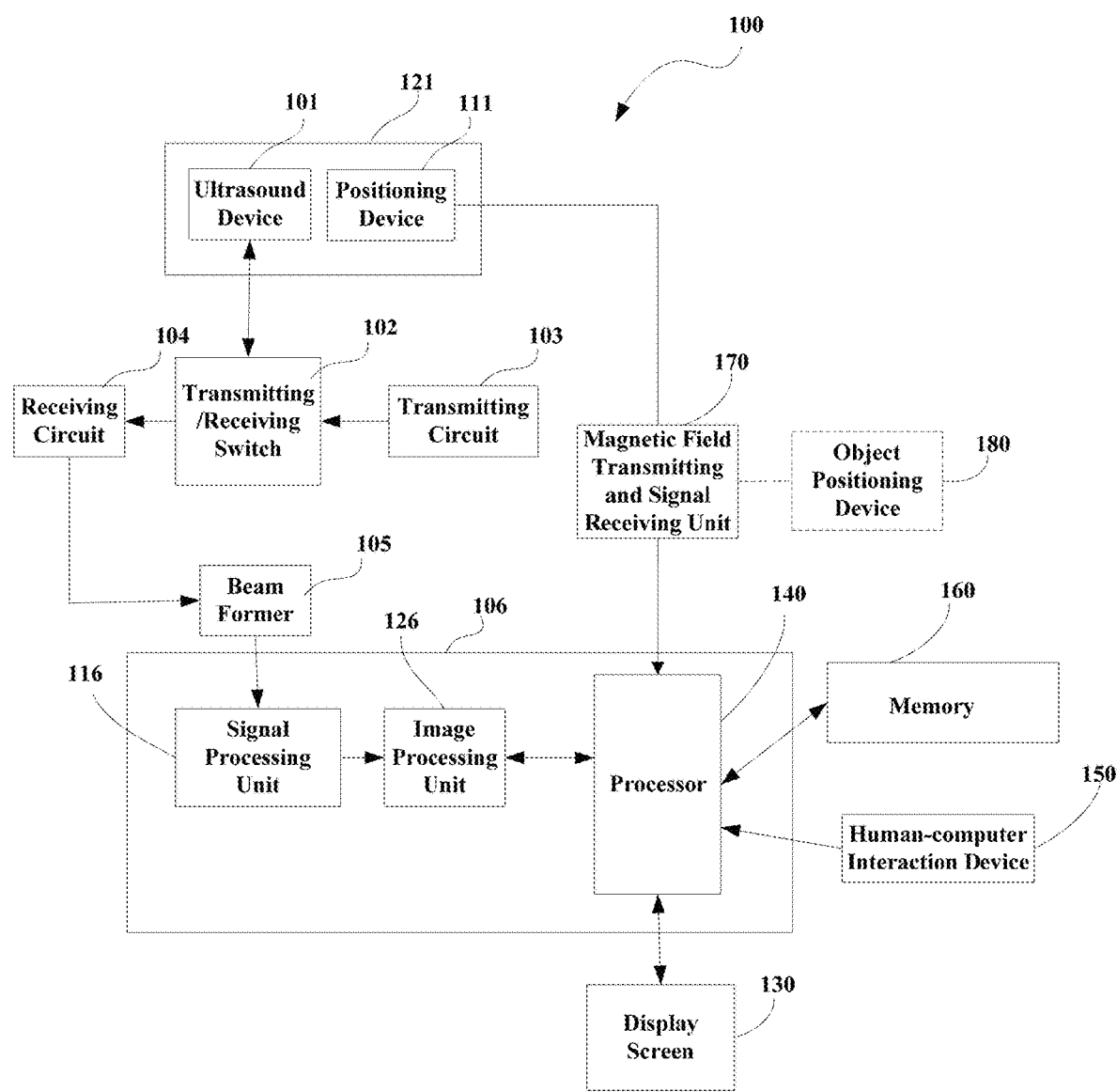
FIG. 1 is a schematic diagram of an ultrasound system for planning ablation in one embodiment.

FIG. 1 shows a schematic structural diagram of an ultrasound system 100 for planning ablation in one embodiment, the specific structures are shown below. The ultrasound system 100 for planning ablation shown in FIG. 1 may mainly include an ultrasound probe 101, a transmitting circuit 103, a transmitting/receiving switch 102, a receiving circuit 104, a beam former 105, a signal processing unit 116, and an image processing unit 126. During the ultrasound imaging process, the transmitting circuit 103 may transmit the delay-focused transmitting pulses with a certain amplitudes and polarities to the ultrasound probe 101 through the transmitting/receiving switch 102. The ultrasound probe 101 may be excited by the transmitting pulses to transmit the ultrasound wave (which may be any one of the plane waves, the focused waves and the diverged waves) to the detection object containing target tissues (for example, the target tissues in the body of a human or animal and the blood vessels therein, etc., and the target tissues herein may include tissues in the human or animal body which need to be cleaned by ablation, such as the tumor tissue), and, after a certain delay, receive the ultrasound echoes carrying the information about the detection object returned from the target region and convert the ultrasound echoes into electrical signals. The receiving circuit 104 may receive the electrical signals converted by the ultrasound probe 101 to obtain the ultrasound echo signals, and send these ultrasound echo signals to the beam former 105. The beam former 105 may perform processing such as focus delay, weighting and channel summation, etc. on the ultrasound echo signals, and then send the ultrasound echo signals to the signal processing unit 116 for related signal processing. The ultrasound echo signals processed by the signal processing unit 116 may be sent to the image processing unit 126. The image processing unit 126 may perform different processing on the signals according to the different imaging modes desired by the user to obtain ultrasound image data in different modes, and then obtain ultrasound images in different modes through processing such as logarithmic compression, dynamic range adjustment and digital scan transformation, etc., such as B image, C image, D image, etc., or other 2D or three-dimensional ultrasound image in other modes. In the actual process of scanning and acquiring the ultrasound images, the transmitting circuit and receiving circuit may excite the ultrasound probe to transmit the ultrasound beams to the detection object according to the set ultrasound imaging ablation parameters and receive the echoes of the ultrasound beams to obtain the ultrasound echo signals. The desired ultrasound image may be obtained according to the ultrasound echo signals, and be displayed to show the target tissue and the surrounding tissue structures. During the real-time scanning and acquisition process of the ultrasound image, the ultrasound images obtained by exciting the ultrasound probes in different positions may be referred to as real-time ultrasound images. The real-time ultrasound images may change according to the adjustment of the orientation of the ultrasound probe or according to the adjustment of the ultrasound imaging ablation parameters. The real-time ultrasound image is different from the frozen image. The frozen image may refer to the image data acquired and stored by the ultrasound imaging system when the freezing function is performed. The ultrasound imaging ablation parameters herein may refer to all of the ablation parameters that can be selected by the user during the imaging process of ultrasound tissue images, such as TGC (Time Gain Compensate), sonic frequency, pulse recurrence frequency (PRF), type of ultrasound waves and dynamic range, etc.

The ultrasound system 100 for planning ablation may also include a display screen 130, a processor 140, a memory 160, and a human-computer interaction device 150. The processor 140 may output the obtained ultrasound image to the display screen 130 for display. The processor 140 may call the computer program instructions stored on the memory 160 to display the ultrasound image on the display screen 130, and obtain the control instructions input by the user on the displayed ultrasound image through the human-computer interaction device. The human-computer interaction device herein may include one of a keyboard, a scroll wheel, a mouse and a touch screen, etc. The display screen 130 may be an ordinary display screen or a touch screen. In the case that the display screen 130 is a touch screen, the human-computer interaction device 150 may also be a touch screen. In this case, when obtaining the control instructions input by the user on the ultrasound image through the human-computer interaction device, the processor 140 may call the computer program instructions stored on the memory 160 to detect the contact of the input object on the touch screen, so as to determine the control instruction input by the user on the displayed ultrasound image.

When the processor 140 call the computer program instructions stored on the memory 160 to detect the contact of the input object (for example, the index finger, the thumb, the stylus pen, special pen for touch display, etc.) on the touch screen, the ultrasound image may be displayed on the touch screen first. The processor 140 may call the gesture detection module stored in the memory 160 to detect the control instruction input by the user by the contact operation on the graphical user interface through the input object. In various embodiments, the touch screen with a graphical user interface (GUI), one or more processors, the memory, and one or more modules, programs or instruction sets stored in the memory and to be used for performing various functions may be included, which may jointly achieve the control input detection based on the graphical user interface (GUI) and the obtaining of the control instructions. In some embodiments of the present disclosure, the user may mainly interact with the graphical user interface through gesture input on the touch screen. The gesture input here may include any type of user gesture input that the device can detect through direct contact with or close to the touch screen. For example, the gesture input may be the user's action of selecting one position, multiple positions and/or multiple continuous positions on the touch screen using the finger (e.g., the index finger, the thumb, etc.) of the right or left hand or using an input object that can be detected by the touch screen (e.g., the stylus pen, the touch screen dedicated pen, etc.), including the operation actions such as contact, release of touch, tapping, long contact or rotation expansion, etc. The gesture detection module may detect the gesture input by the input object on the touch screen, such as determining whether a contact has occurred, determining whether the gesture input is being continuously input, determining whether it corresponds to a predetermined gesture, determining the operation position of the gesture input, determining whether the operation position of the gesture input is moved to the edge of the corresponding display area, determining whether the gesture input has been interrupted (e.g., whether the contact has stopped), determining the movement of the gesture input and tracking the movement trajectory of the gesture input, determining the movement rate (amplitude), the movement velocity (amplitude and direction) and/or the movement acceleration (change in amplitude and/or direction) of the operation position of the gesture input, determining the movement trajectory, etc. The gesture detection module may be stored in the memory, and may be called by one or more processors to achieve the monitoring to the gesture input to obtain the user's operation input instruction.

Whether the control instructions input by the user is obtained through the keyboard or the scroll wheel in the human-computer interaction device or through the touch screen, etc., the ultrasound imaging ablation parameters of the ultrasound probe may be adjusted, or the operation mode of the ultrasound probe may be switched, or the spatial position of the probe may be adjusted, according to the control instructions. The operation mode may include contrast enhanced imaging, elasticity imaging or the like.

In addition, the ultrasound system 100 for planning ablation may also include a navigation system. In FIG. 1, the navigation system may include a magnetic field transmitting and signal receiving unit 170 and a positioning device 111 fixed on the ultrasound probe 101. In addition, in one embodiment, the ultrasound system 100 for planning ablation may further include a body positioning device 180.

The magnetic field transmitting and signal receiving unit 170 may generate a magnetic field, receive a signal fed back by the positioning device 111 located in the magnetic field, and obtain the spatial orientation information of the positioning device 111 with respect to the magnetic field according to the fed signal. The spatial orientation information may be expressed in different coordinate systems and used to display at least one of the position information and the orientation information with respect to the magnetic field. The magnetic field herein may include an electromagnetic field. For example, in one embodiment, the magnetic field transmitting and signal receiving unit 170 may be connected to the positioning device 111 by a data cable or by wireless connection. The magnetic field transmitting and signal receiving unit 170 may be configured to transmit the magnetic field and receive the position information returned from the positioning device 111. The specific positioning principle is that the positioning device 111 is placed within the magnetic field and the positioning device (such as a positioning coil) feeds back the magnetic field related information of the current position to the magnetic field transmitting and signal receiving unit 170, which may calculate the current spatial coordinates and direction of the positioning device, such as (x, y, z, a, b, c), where the first three coordinates are the spatial coordinates (i.e., the position information) of the positioning device 111 with respect to the magnetic field at the current time while the last three ablation parameters are the direction information (i.e. the orientation information) of the positioning device 111 with respect to the magnetic field at the current time. The spatial coordinates and orientation information of object may also be expressed with the Euler angles, quaternions and matrices. In the following description, the direction information and spatial coordinates (i.e., the position information) of the positioning device 111 with respect to the magnetic field at the current time may be expressed as (x, y, z, a, b, c), which jointly represent the spatial orientation information returned from the positioning device. Alternatively, it may also be possible to express the spatial orientation information only using (x, y, z) or (a, b, c).

As shown in FIG. 1, the positioning device 111 may be fixed on the ultrasound probe 101. When the positioning device 111 is placed within the range of the magnetic field, it can return in real-time its spatial orientation information in the magnetic field at the current time, such as the position information and/or the direction information. The spatial orientation information returned in real time by the positioning device 111 fixed on the ultrasound probe 101 may be equivalent to the current spatial orientation information of the ultrasound probe. A slot may be designed so as to fix the positioning device 111 on the ultrasound probe 101 at a certain location to form the probe 121. The positioning device 111 may also be built into the ultrasound probe 101 when manufacturing the probe, thereby forming the probe 121. Based on the spatial orientation information of the ultrasound probe (for example, it can be expressed in a matrix), a mapping matrix Pi may be calculated. The mapping matrix may be used to map the coordinates of the probe 121 in the image space coordinate system to the magnetic field coordinate system formed by the magnetic field, where i represents the current time. The mapping matrix Pi may include the following two parts.

The first part is the mapping matrix A which maps the image space coordinate system of the ultrasound probe to the magnetic field space coordinate system where the positioning device 111 is located. The second part is the orientation information Ri of the positioning device 111 in the magnetic field at the current time. That is, Pi=Ri*A. The navigation system including the positioning device 111 and the magnetic field transmitting and signal receiving unit 170 may be formed by related technologies in the field of navigation devices. For details, reference may be made to the description in the related field, which will not be described in detail here. In the present embodiment, the navigation system may use, but not limited to, the magnetic field positioning methods above. Any method which can determine the spatial orientation information of the ultrasound probe in the actual space may be used in the navigation system.

An object positioning device 180 may be an optional device of the ultrasound system 100 for planning ablation. The device may return in real time its current spatial orientation information when it is placed in the generated magnetic field above. Regarding the description of the spatial orientation information in this embodiment, reference may be made to the related description above. For example, it may include position information and direction information (reference may be made to the description of the positioning device 111 above). The object positioning device 180 may be placed on the surface of the examined object (such as a human body or an animal), and used to obtain the spatial orientation information of the current examined object or the motion information of the surface of the examined object. The object positioning device 180 may be fixed on the surface of the examined object containing the detection object. The magnetic field transmitting and signal receiving unit 170 may receive the detection signals returned by the object positioning device 180 in the magnetic field and obtain the spatial orientation information of the object positioning device 180 with respect to the magnetic field and/or the motion information of the surface of the examined object according to the detection signals. The motion information of the surface of the examined object mentioned herein may include the respiratory motion information of the examined object, such as the respiratory frequency. The obtained detection information may be used to correct the information obtained by the positioning device 111 on the ultrasound probe. For example, the spatial orientation information obtained by the positioning device 111 may be corrected according to the detection signals returned by the object positioning device 180. The object positioning device 180 may be fixed to the skin surface of the examined object using double-sided tape, adhesive tape, bandage, etc. The object positioning device 180 maintains its position on the skin surface during the entire ultrasound image scanning and acquisition process.

The ultrasound probe may be various types of probe, such as two-dimensional convex array probes, three-dimensional convex array probes, four-dimensional array probes, linear array probes, etc. When different probes are used to evaluate the ablation effect, the used specific data processing technologies may be adjusted according to the type of the probe.

The processor 140 may obtain the real-time ultrasound image and the spatial orientation information corresponding to an orientation when the ultrasound probe is located at such orientation in the magnetic field through the device above. Through the correspondence relationship between the spatial orientation information and the real-time ultrasound image, it is possible to display and analyze the real-time ultrasound image and the related spatial orientation information or perform other processing. In some embodiments of the present disclosure, the signal processing unit 116 and the image processing unit 126 in FIG. 1 may be integrated on one main board 106. Alternatively, either or both of the signal processing unit 116 and the image processing unit 126 may be implemented in one or more processors/controller chips. In the embodiment shown in FIG. 1, the processor 140 and the memory 160 may be arranged on the main board 106. Alternatively, they may be arranged separately from the main board 106. The processor 140 may also be integrated with the signal processing unit 116 and the image processing unit 126 in FIG. 1 in one or more processors/controller chips. The magnetic field transmitting and signal receiving unit 170 and the positioning device 111 (and potentially the object positioning device 180) may form a magnetic navigation and positioning system.

Based on the structural schematic diagram of the ultrasound system 100 for planning ablation provided in FIG. 1 above, the execution flow of the evaluation methods for ultrasound intervention surgery simulation guidance in the embodiments will be described in details in conjunction with the hardware provided in FIG. 2 to FIG. 6.

1. Based on the ultrasound imaging device with the navigation system in FIG. 1, a method for intervention ablation planning based on real-time ultrasound images may be provided. The specific process is shown in FIG. 2.

Figure 2:
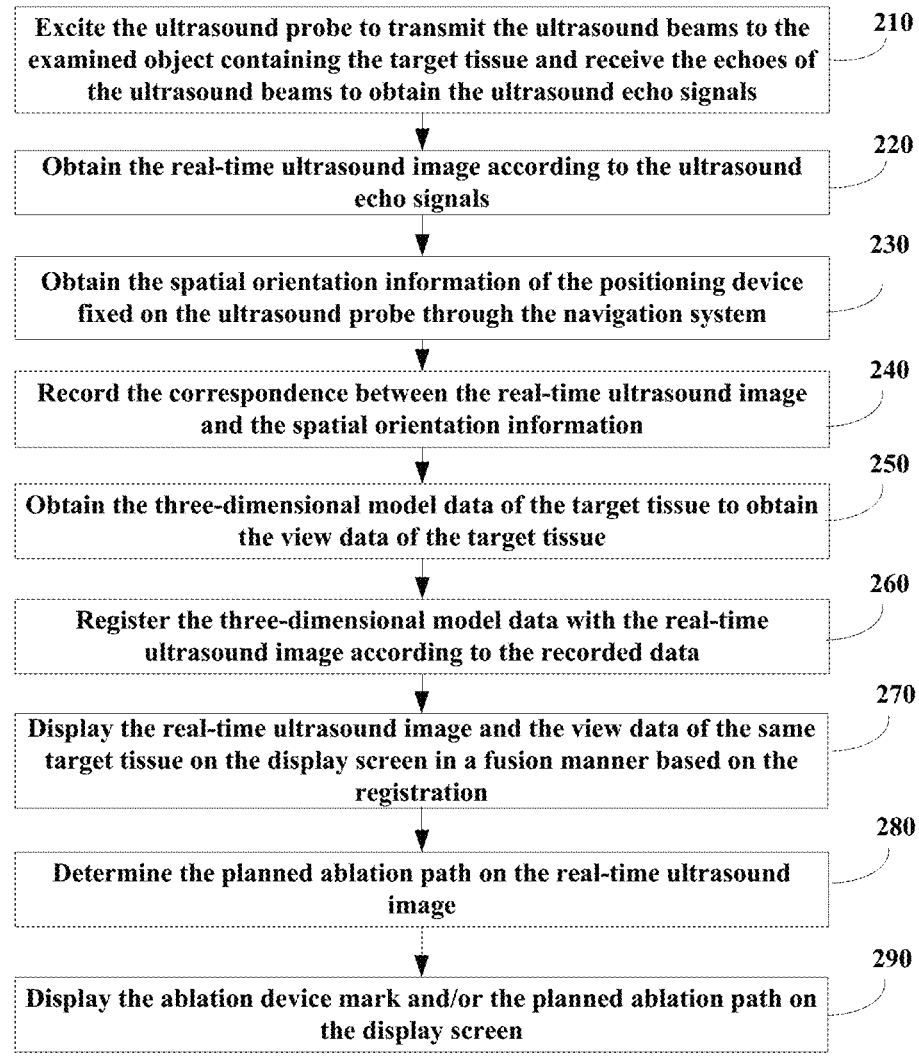
FIG. 2 is a schematic flowchart of the device in FIG. 1 in one embodiment.

In step 210 in FIG. 2, the transmitting circuit and the receiving circuit (103 and 104) may excite the ultrasound probe (101) to transmit ultrasound beams to the detection object containing a target tissue according to the set ultrasound imaging ablation parameters and receive the echoes of the ultrasound beams to obtain the ultrasound echo signals. Moreover, in step 220 in FIG. 2, the image processing unit (126) may obtains a real-time ultrasound image according to the ultrasound echo signals based on a part or all of the ultrasound imaging ablation parameters. The real-time ultrasound images herein may be ultrasound images of different modes as described above, such as B images, C images, D images, etc., or other types of 2D ultrasound images or three-dimensional ultrasound images. The real-time ultrasound images obtained in this embodiment may be ultrasound images obtained when the ultrasound probe is located at arbitrary position. The real-time ultrasound image may be one frame of ultrasound image currently obtained, or be continuous multiple frames of ultrasound image.

In step 230 of FIG. 2, the spatial orientation information of the positioning device fixed on the ultrasound probe may be obtained through the navigation system. The navigation system may include at least the positioning device 111 above. The positioning device 111 may be fixed on the ultrasound probe 101 in the manner above. The magnetic field transmitting and signal receiving unit 170 may generate a magnetic field which can cover the space region including the positioning device 111. The magnetic field transmitting and signal receiving unit 170 may receive the signals returned by the positioning device 111 in the magnetic field, and obtain the spatial orientation information of the positioning device 111 with respect to the magnetic field according to the signals returned by the positioning device 111.

In step 240 in FIG. 2, the processor 140 may call the program in the memory to associate the real-time ultrasound image and the spatial orientation information to obtain the correspondence therebetween according to the spatial orientation information obtained in the steps above, so as to obtain the mapping relationship between the image space coordinate system and the magnetic field space coordinate system where the magnetic field is located. Using this mapping relationship, the spatial orientation of the real-time ultrasound image and the spatial orientation of one of the obtained three-dimensional model data and the ultrasound probe may be mapped to a same coordinate system, so as to facilitate the display in fusion manner. The image space coordinate system may be represented as the coordinate system space where the image pixels of the real-time ultrasound image obtained by acquiring a target tissue through the ultrasound probe are located, and the magnetic field space coordinate system where the magnetic field is located may be the coordinate system space within the range of the magnetic field. The mapping relationship between the image space coordinate system and the magnetic field space coordinate system herein may be expressed by the mapping matrix above. In this embodiment, the spatial orientation information of the ultrasound probe may be obtained in real time through the magnetic field transmitting and signal receiving unit, while the real-time ultrasound image at each time may be obtained by activating the ultrasound probe in real time. Therefore, the ultrasound system for ablation planning may associate the real-time ultrasound image with the spatial orientation information of the ultrasound probe when acquiring the real-time ultrasound image and store the correspondence therebetween. For example, when the ultrasound probe is used to obtain the image data loop (the image data loop herein may include continuous multiple frames of two-dimensional ultrasound images, but not limited thereto), the spatial orientation information of the ultrasound probe corresponding to each frame of image in the image data loop may be correspondingly obtained. Through the positioning device, the object positioning device and the magnetic field transmitting and signal receiving unit in the device shown in FIG. 1, the correspondence between any frame of real-time ultrasound image and the spatial orientation information of the ultrasound probe in the magnetic field space coordinate system may be obtained and recorded. For example, the correspondence may be established by exciting the ultrasound probe located in one orientation to correspondingly obtain a real-time ultrasound image corresponding to such orientation and the spatial position information of such orientation and storing these information.

In step 250 in FIG. 2, the processor 140 may obtain the three-dimensional model data of the target tissue to obtain the view data of the target tissue. The three-dimensional model data herein may include at least one of size information, shape information, position information and blood vessel distribution information in the surrounding tissue. The three-dimensional model data may be a single-frame static image data or a image data loop. For example, it may include various modalities of three-dimensional image data if the target tissue, such as CT, MRI or three-dimensional ultrasound contrast enhanced image.

The three-dimensional model data may be pre-stored offline image data acquired by another device or the device of the present embodiment. Alternatively, the three-dimensional model data may be three-dimensional image data acquired in the field by the ultrasound system for planning ablation of the present disclosure. In one embodiment, the three-dimensional model data may be derived from the image data acquired before the surgery. In another embodiment, the three-dimensional model data of the target tissue in step 250 may be obtained through the following steps.

First, the image data loop containing the target tissue may be acquired through the ultrasound probe. The image data loop may be acquired after perfusion of the contrast agent. Regarding the details of the acquisition, reference may be made to the embodiment shown in FIG. 5. Thereafter, the spatial orientation information of the ultrasound probe when the ultrasound probe is at different orientations when acquiring the image data loop may be obtained through the navigation system. The processor may map each frame of image in the image data loop into the magnetic field space coordinate system according to the spatial orientation information of the ultrasound probe to reconstruct the three-dimensional ultrasound image, thereby obtaining the three-dimensional model data of the target tissue.

Detailed description will be provided below in connection with the flow chart in FIG. 5 taking obtaining the image data loop in the contrast enhanced imaging mode as an example.

Figure 5:
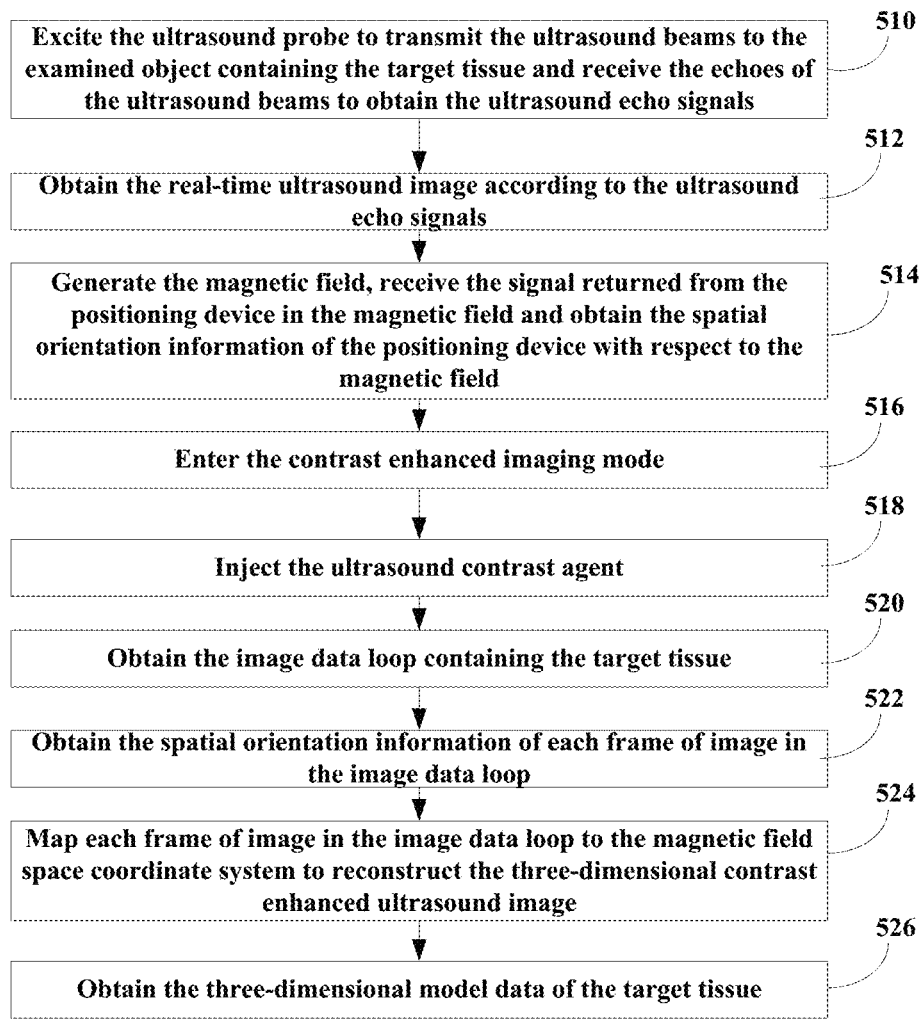
FIG. 5 is a schematic flowchart of the device in FIG. 1 in a contrast enhanced mode.

In step 510 in FIG. 5, the transmitting circuit and the receiving circuit (103 and 104) may excite the ultrasound probe (101) to transmit the ultrasound beams to the detection object containing the target tissue and receive the echoes of the ultrasound beams to obtain the ultrasound echo signals. In step 512 in FIG. 5, the image processing unit may obtain the real-time ultrasound images according to the ultrasound echo signals. For details, reference may be made to steps 210 and 220 in FIG. 2. In addition, in step 514, the magnetic field transmitting and signal receiving unit 170 may generate a magnetic field, receive the signal returned by the positioning device 111 located in the magnetic field, and obtain the spatial orientation information of the positioning device 111 with respect to the magnetic field according to the signal returned by the positioning device 111. For details, reference may be made to step 230 in FIG. 2. After performing the steps above, the ultrasound probe may be moved to find the target tissue in the examined body, so as to obtain the section image containing the target tissue. Thereafter, in step 516, a mode switching instruction input by the user may be received, and the contrast enhanced imaging mode may be entered, that is, the ultrasound contrast agent may be injected into the examined body (step 518). During the perfusion in the target tissue, the image data loop containing the target tissue may be acquired (Step 520). The image data loop herein may include multiple frames of continuous two-dimensional images. In order to better reconstruct more accurate three-dimensional model data in following steps, the obtained image data loop may be an image data loop in a predetermined duration obtained when the ultrasound probe swings in a fixed direction or is located at different positions near the target tissue. Therefore, in the process of acquiring the image data loop, the spatial orientation information of the ultrasound probe in different orientations may be obtained through the magnetic field transmitting and signal receiving unit 170, and the ultrasound probe swinging in the fixed direction or being located at different positions near the target tissue may correspond to different orientations in the space. Therefore, the spatial orientation information corresponding to each frame of the image in the image data loop will be obtained. In step 522, the spatial orientation information associated with each frame of image in the image data loop may be obtained, which for example may be represented by the mapping matrix Pi. Thereafter, in step 524, each frame of image in the image data loop may be mapped to the magnetic field space coordinate system according to the spatial orientation information of each frame of image in the obtained image data loop to reconstruct the three-dimensional ultrasound contrast enhanced image, thereby obtaining one of the three-dimensional model data (step 526). The reconstruction algorithm above may be a free hand reconstruction based on the navigation system, in which each pixel in each frame of image may be mapped into the magnetic field space coordinate system according to the mapping matrix Pi to form a point set in three-dimensional space and a three-dimensional cuboid data may be generated based on this point set using an interpolation algorithm (nearest neighbor interpolation, linear interpolation, etc.), thereby obtaining the three-dimensional ultrasound contrast enhanced images. In other embodiments, it will not be limited to the contrast enhanced imaging mode in the embodiments above, and the image data loop may also be obtained based on M mode, B mode, etc., so as to reconstruct the three-dimensional ultrasound image.

Based on the obtained three-dimensional model data of the target tissue, the three-dimensional volume information of the target tissue may be obtained to obtain the view data of the target tissue. For example, after obtaining the three-dimensional model data of the target tissue, the three-dimensional volume of the target tissue may be obtained by image segmentation and extraction. The image segmentation and extraction may include segmenting and extracting the shape, position information, tissue size and tissue depth, etc. of the target tissue from the three-dimensional ultrasound image. There may be many segmentation methods. In a manual segmentation method, the boundary of the target tissue may be manually drawn on each frame of the two-dimensional section image in the three-dimensional image data, and these two-dimensional section image segmentation results may generate the three-dimensional volume (T) of the target tissue. It may also be possible to use interactive (such as semi-automatic) or fully automatic segmentation algorithms. For details, reference may be made to the relevant image segmentation technologies, which will not be described in detail here. In actual ablation, not only the area where the target tissue is located, but also the tissue within a certain area around the target tissues (that is, the safety boundary of the target tissues), should be ablated. The safety boundary may mean a boundary obtained by expanding the area where the target tissue is located outwards by about 5 mm, because during the ablation of a certain tissue, the ablation area is generally required to cover an area whose boundary is obtained by expanding the boundary of the area of the certain tissue outward by about 5 mm so as to completely ablate the certain tissue. Therefore, the multi-needle ablation area should not only cover the area of the certain tissue area, but also cover the safety boundary. The symbol T may be used to denote the target tissue and the safety boundary of the target tissue. The volume data in the safety boundary will contain the target tissue, and both of them need to be ablated during the intervention ablation. In the field of image processing, the safety boundary of the three-dimensional volume may be generated by expanding the area of the target tissue outward by a certain distance (the expansion algorithm is a simple morphological filtering algorithm). Therefore, in the present step, the three-dimensional volume of the target tissue may be the tissue area of the target tissue, or may be the ablation area corresponding to the target tissue, such as the area contained by the safety boundary corresponding to the target tissue. The three-dimensional volume of the target tissue may contain at least one of the target tissue shape, the position information, the tissue size, the tissue depth, the information around the target tissue such as the blood vessel distribution information, and the safety boundary. The view data mentioned in this embodiment may include at least one of the section image data of the target tissue, the three-dimensional image data of the target tissue, the two-dimensional image data formed by the three-dimensional volume obtained by segmentation of the target tissue, and the three-dimensional image or icon data formed by the three-dimensional volume obtained by segmentation of the target tissue. The image or icon data may not be real image data, but may be an icon used to represent the three-dimensional volume information on the figure or image. The three-dimensional volume information here may include one or more of the target tissue shape, the target tissue position information, the target tissue size, the target tissue depth and the safety boundary, etc.

In step 260 in FIG. 2, the processor 140 may register the three-dimensional model data with the real-time ultrasound image according to the correspondence obtained above, such as the correspondence between the real-time ultrasound image and the spatial orientation information, so as to obtain the correspondence between the three-dimensional volume and the real-time ultrasound image, thereby obtaining the mapping relationship between the three-dimensional volume, the real-time ultrasound image and the space where the positioning device is located. Based on the mapping relationship, fusion display may be performed. For example, in one embodiment, the real-time ultrasound image may be displayed on the display screen, and the view data of the target tissue may be displayed on the ultrasound image in a fusion manner. In one embodiment, according to the mapping relationship, based on the obtained spatial orientation information of the real-time ultrasound image, the real-time ultrasound image and the view data of the target tissue may be mapped into the same coordinate system.

In step 270 in FIG. 2, based on the result of the registration, the processor may display the real-time ultrasound images and the view data of the same target tissue on the display screen in a fusion manner.

The obtained three-dimensional model data and real-time ultrasound image may be displayed in a fusion and linkage manner. That is, the three-dimensional model data and the real-time ultrasound image may be registered in the registration step, such that the real-time ultrasound image and a part or all of the three-dimensional model data may be displayed in real time in a linkage manner. For example, the two-dimensional section image or the three-dimensional volume, etc. corresponding to the current real-time ultrasound image in the three-dimensional model data may be displayed with the real-time ultrasound image in a linkage manner.

In the registration and fusion of the three-dimensional model data with the real-time ultrasound image, the registration and fusion of the CT/MRI image with the real-time ultrasound image may be used to establish the fusion linkage of the three-dimensional ultrasound data (including the target tissue information) with the real-time ultrasound image. There are many methods for image registration and fusion, such as point-to-point registration, section-to-section registration, vertical-section registration, etc. For example, in the section-to-section registration, one section image may be selected in the three-dimensional model data, a same section image in the real-time ultrasound images may be obtained from the examined object with the ultrasound probe (the mapping matrix may be Pt at this case), and a second mapping relationship M between the three-dimensional model data and the image space coordinate system where the current ultrasound real-time image is located may be established. The mapping relationship for mapping each pixel in the three-dimensional model data to the magnetic field space coordinate system may be Pt*M, and the mapping relationship for mapping the three-dimensional volume of the target tissue to the magnetic field space coordinate system may be Ts=Pt*M*T, where Ts represents the three-dimensional volume in the magnetic field space coordinate system of the magnetic field.

The three-dimensional view data or the two-dimensional view data representing the three-dimensional volume may be extracted from the three-dimensional volume registered with the real-time ultrasound image to be displayed with the real-time ultrasound image data in a fusion manner. At least three display modes may be used: displaying the three-dimensional view data and the two-dimensional real-time ultrasound image corresponding to target tissue, displaying the three-dimensional view data and the three-dimensional real-time ultrasound image corresponding to the target tissues, and displaying the two-dimensional view data and the real-time ultrasound image corresponding to the target tissue. The three display modes above may be simultaneously displayed on the same interface of the display screen. For example, the three display modes may be respectively displayed in multiple display areas in the same interface.

In step 270 in FIG. 2, the processor 140 may display the real-time ultrasound image and the view data of the target tissue in a fusion manner so as to form at least one fusion image. In one embodiment, the view data of the target tissue may be display on one frame of real-time ultrasound image so as to form one frame of fusion image. When three-dimensional volume of the target tissue is used, the three-dimensional volume may be mapped to the magnetic field space coordinate system according to the Ts=Pt*M*T above, so as to achieve mapping the view data of the target tissue and the real-time ultrasound image to the same space coordinate system and displaying the real-time ultrasound image and the view data of the target tissue on the fusion image according to the image data corresponding to the space coordinate system. For example, in one embodiment, one frame of real-time ultrasound image may be extracted, and output for display. Based on the registration of the real-time ultrasound image with the view data of the target tissue, the corresponding position of the view data of the target tissue in the real-time ultrasound image may be determined. The view data of the target tissue may be superimposed on said frame of real-time ultrasound image according to the determined position to form at least one fusion image. In the present embodiment, the real-time ultrasound image may be a two-dimensional image or a three-dimensional image.

The processor 140 may display the real-time ultrasound image on the display screen 130. When displaying the real-time ultrasound images on the display screen, they may be displayed in multiple screens or multiple windows. In addition, while displaying the real-time ultrasound images, the image corresponding to real-time ultrasound image in the three-dimensional model data may also be displayed synchronously.

Figure 7:
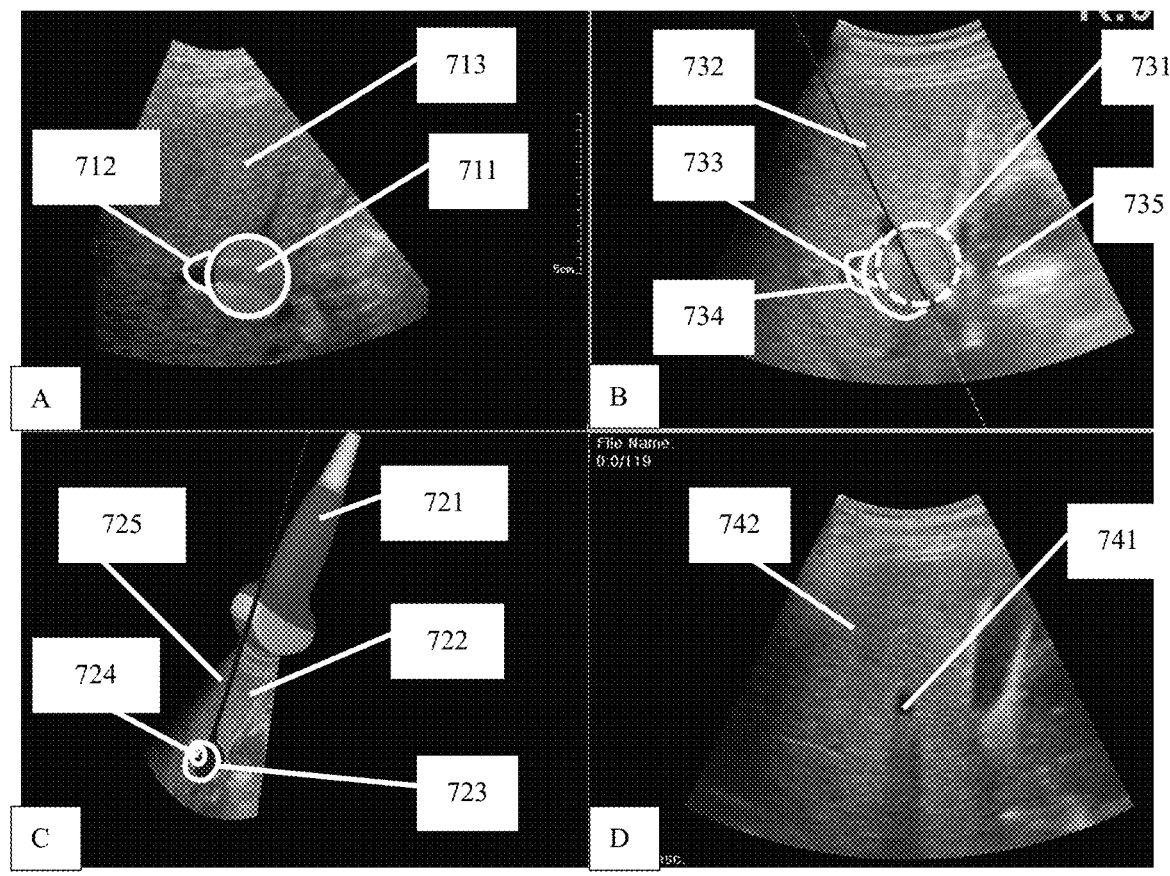
FIG. 7 is a schematic diagram of a display interface of the device in FIG. 1 in one embodiment.

In one embodiment, as shown in FIG. 7, displaying the three-dimensional volume on the real-time ultrasound image may include at least one of the following methods.

In the first method, referring to the image B at the upper right corner of FIG. 7, the two-dimensional view data of the target tissue (the circular area 734 in the figure) may be drawn on the real-time ultrasound image (the fan-shaped area 735 in the figure) to highlight the area where the three-dimensional volume is located on the real-time ultrasound image. In addition, the ablation area (731, 733) and the intervention device (such as the ablation needle 732) may also be marked in the image B.

In the second method, referring to the image A at the upper left corner of FIG. 7, the image data (713 in the figure) corresponding to the real-time ultrasound image may be extracted from the three-dimensional model data according to the real-time ultrasound image (735 in the figure), and displayed. The two-dimensional view data 712 of the target tissue may be drawn on the displayed image data 713, so as to highlight the area where the three-dimensional volume is located on the image data extracted from the three-dimensional model data. In addition, the ablation area 711 may also be marked in the image A.

In the third method, referring to the image C at the lower left corner of FIG. 7, a fusion image (such as the image C at the lower left corner) in the magnetic space coordinate system may be generated according to the correspondence between the real-time ultrasound image and the spatial orientation information. The position relationship between the ultrasound probe 721 and the real-time ultrasound image 722 may be displayed on the fusion image C, and the three-dimensional view data 724 of the target tissue may be marked at the corresponding position in the fusion image C. In addition, in one embodiment, as shown in FIG. 7, the intervention device (such as the ablation needle 725) and the ablation area 723 may also be marked in the fusion image C.

Either the image B or the image C in FIG. 7 may be the fusion image mentioned herein. The fusion image may be obtained by superimposing the three-dimensional volume mark on the two-dimensional real-time ultrasound image (the three-dimensional volume mark may also be a circle, as shown in image B in FIG. 7), or may be obtained by superimposing the three-dimensional volume mark on the three-dimensional real-time ultrasound image. Alternatively, the fusion image may be a combined image generated based on the spatial positional relationship between the real-time ultrasound image and the ultrasound probe (as shown in image C in FIG. 7).

It can be seen that, in some embodiments, the view data of the target tissue superimposed on the real-time ultrasound image may be the icon shown in FIG. 7 so as to mark one of more of the target tissue shape, target tissue position, target tissue size, target tissue depth and the safety boundary at the corresponding position in the real-time ultrasound image.

In FIG. 7, a straight line is used as an ablation device mark representing the ablation device. The planned ablation path may be represented by displaying the ablation device mark and the predicted ablation area on the real-time ultrasound image data, where the predicted ablation area may be displayed at the end of the ablation device mark. When the position of the ablation device mark on the real-time ultrasound image changes, the position of the predicted ablation area will change accordingly. When the orientation of the ultrasound probe changes, the ablation device mark and/or the predicted ablation area will change accordingly.

In step 280 in FIG. 2, the planned ablation path may be determined on the real-time ultrasound image. For example, based on the real-time ultrasound image, the user's input on the real-time ultrasound image may be received through the human-machine interactive device, and the processor 140 may determine the planned ablation path based on the input of the user.

The planned ablation path mentioned herein may include at least one of the angle of the puncture guide line, the direction of the puncture guide line, the path of the ablation needle, the depth of the ablation path, the predicted ablation area, the ablation power, the number of ablation needles, the predicted working time and the predicted ablation range (or ablation area), etc. The path of the ablation needle may include the needle insertion distance, the needle insertion angle, the needle insertion depth, the needle insertion position or the like. In the present embodiment, based on the real-time ultrasound image and the view data of the target tissue displayed on the display screen in a fusion manner, the user may set the path of the ablation needle based on the real-time ultrasound image displayed on the display screen, so as to accurately position the path of the interventional ablation in the examined body, thereby improving the accuracy of the ablation path planning, improving the ablation effect, and reducing the risk of surgery. The ablation device mentioned herein may include one or more ablation needles or interventional catheters, etc. In the present disclosure, the ablation needle is taken as an example for description. In the present embodiment, the ablation path may be planned based on the displayed real-time ultrasound image, the three-dimensional volume of the target tissue and/or the image data corresponding to the real-time ultrasound image extracted from the three-dimensional model data. Regarding setting the ablation information based on the real-time ultrasound image, reference may be made to the methods shown in FIG. 3 and FIG. 4.

In step 290 in FIG. 2, the processor may display the ablation device and/or the ablation path on the fusion image according to the planned ablation path. For example, as shown in FIG. 7, the ablation needle 732 is shown in image B, and the ablation needle 725 is shown in image C. The ablation areas (731, 733) are marked in image B. The ablation area 723 is marked in the fusion image C.

Based on different planning situations, different methods for marking may be used. For example, in one embodiment, the processor may mark the ablation device and/or the ablation path on the fusion image by the following methods. For example, as shown in image C in FIG. 7, the position relationship between the ultrasound probe and the real-time ultrasound image may be obtained according to the correspondence between the real-time ultrasound image and the spatial orientation information, and the positional relationship between the ultrasound probe and the real-time ultrasound image may be marked in the fusion image. The real-time ultrasound image here may be a three-dimensional image or a two-dimensional image. In the fusion image C in FIG. 7, the scanning relationship between the scanning area of the ultrasound probe and the real-time ultrasound image may be displayed, the three-dimensional view icon 724 of the target tissue may be displayed at the corresponding scanning depth in a fusion manner, and the ablation area 723 may be marked and the ablation needle 725 may be set. From this image, the position relationship between the ablation needle, the ultrasound probe and the real-time ultrasound image in the actual space may be clearly understood, which is convenient for the user to understand the actual planning situation more intuitively. More accurate planning and positioning may be achieve in connection with the image B. Based on the correspondence between the real-time ultrasound image and the spatial orientation information, the positional relationship between the ultrasound probe and the real-time ultrasound image may be determined according to the position of the scanning plane of the ultrasound probe. In addition, in one embodiment, when marking the ablation device, the position of the ablation device in the real-time ultrasound image or the orientation relationship between the ablation device and the probe and the real-time ultrasound image may be obtained according to the angle at which the ablation device is fixed on the ultrasound probe or the relative angle relationship between the ultrasound probe and the ablation device in connection with the real-time ultrasound image and the obtained spatial orientation information to convert the position of the ablation device in the real-time ultrasound image.

In some embodiments, as shown in FIG. 7, a probe icon (721) representing the ultrasound probe may be displayed on the display screen. The display position of the probe icon may change with the change of the collected spatial orientation information.

In some embodiments, at least one of the following ways may be used to display the ablation device mark and/or the planned ablation path on the display screen.

In one way, the predicted ablation area may be displayed as following the ablation device mark on the obtained real-time ultrasound image. For example, when the ablation parameters of the ablation device mark such as the depth or angle, etc. are adjusted according to the instruction input by the user, the displayed predicted ablation area may also be changed accordingly.

In one way, the overlapping relationship between the view data of the target tissue and the predicted ablation area may be obtained and output. For details, reference may be made to the description of related embodiments below.

In one way, the probe icon may be drawn and the predicted ablation area may be marked on the corresponding position on the real-time ultrasound image on the same fusion image or in the same window, such as the image C in FIG. 7.

In some embodiments, the display screen may include multiple windows, and the data displayed in the multiple windows may correspondingly change as the position of the ultrasound probe changes.

In some embodiments, the multiple windows may respectively display multiple fusion images of the two-dimensional real-time ultrasound image or the three-dimensional real-time ultrasound image with one of the three-dimensional view data and the two-dimensional view data.

2. Based on the embodiments shown in FIG. 1 and FIG. 2, the process of determining the ablation path of the ablation device on the real-time ultrasound image in step 280 may be shown in FIG. 3.

Figure 3:
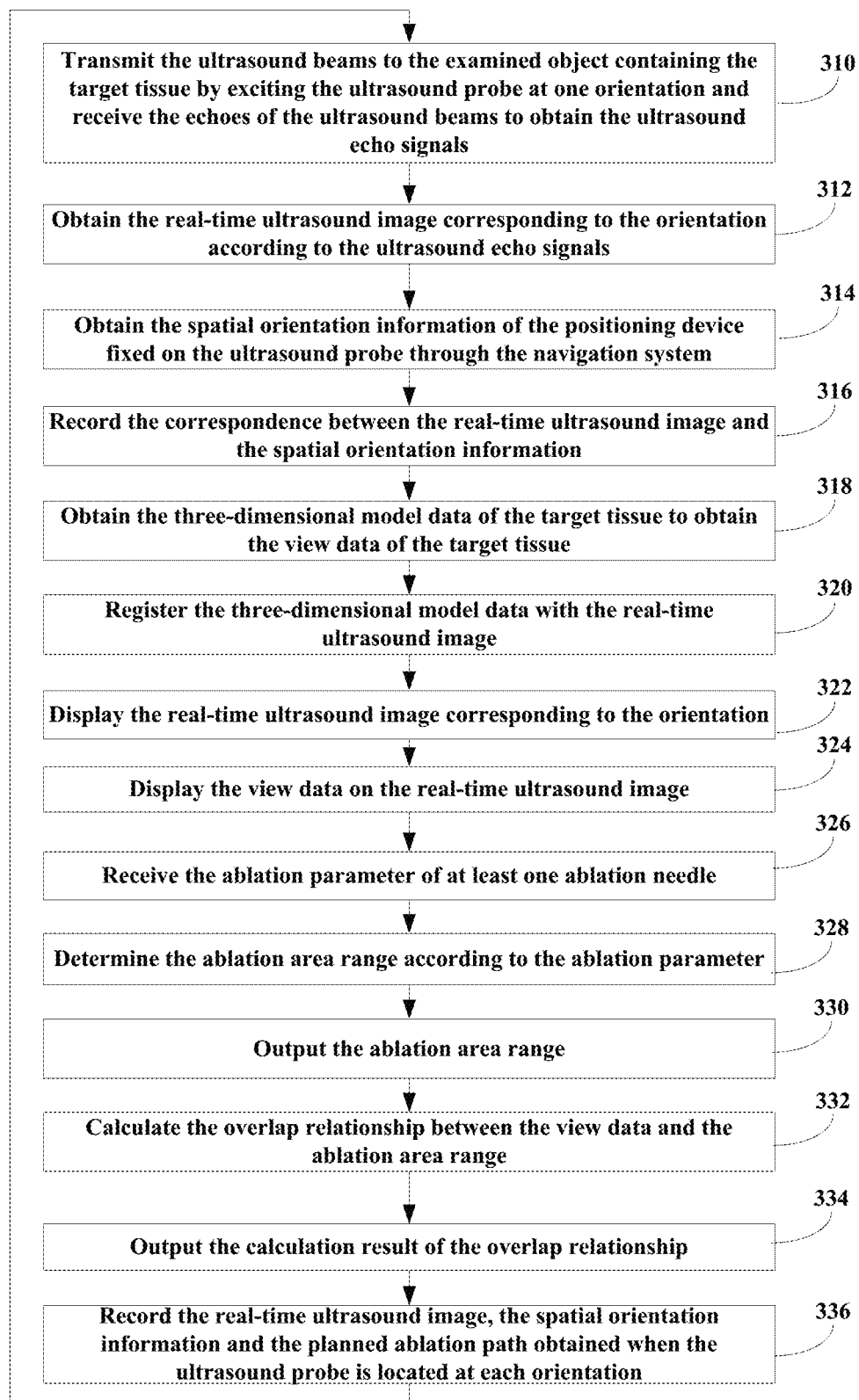
FIG. 3 is a schematic flowchart of the device in FIG. 1 in another embodiment.

In steps 310 to 312 in FIG. 3, the transmitting circuit and receiving circuit (103 and 104) in FIG. 1 may be configured to transmit the ultrasound beams to the examined object containing the target tissue by exciting the ultrasound probe located at one orientation Q1, and receive the echoes of the ultrasound beams to obtain the ultrasound echo signals.

According to the ultrasound echo signals, the real-time ultrasound image S1 corresponding to the one orientation Q1 may be obtained. When the user moves or swings the ultrasound probe on the surface of the examined body, the ultrasound probe will be excited at different orientations Qn (n=1, 2, . . . , N, where N is a natural number greater than 1) to obtain at least one frame of real-time image Sn (n=1, 2, . . . , N, where N is a natural number greater than 1) corresponding to different orientations. Alternatively, moving the ultrasound probe to different orientations may also be achieved by a motor.

In steps 314 to 316 in FIG. 3, the spatial orientation information of the positioning device fixed on the ultrasound probe may be obtained through the navigation system, that is, the spatial orientation information of the orientation Q1. The real-time ultrasound image may be associated with the spatial orientation information of the orientation Q1 to record the correspondence therebetween, thereby obtaining the mapping relationship between the image space coordinate system and the magnetic field space coordinate system. Regarding the specific implements of steps 314 to 316, reference may be made to steps 230 and 240 in FIG. 2.

In steps 318 and 320 in FIG. 3, the processor may obtain the three-dimensional model data of the target tissue to obtain the view data of the target tissue, and register the three-dimensional model data with the real-time ultrasound image to obtain the mapping relationship between the the three-dimensional model data and the real-time ultrasound image in the image space coordinate system or the magnetic field space coordinate system, so as to achieving displaying the view data of the target tissue on the real-time ultrasound image in a fusion manner. For details, reference may be made to step 250 and step 260 in FIG. 2.

In step 322 in FIG. 3, the real-time ultrasound image S1 corresponding to the orientation Q1 may be displayed, and the three-dimensional information of the target tissue may be displayed on the real-time ultrasound image S1 in a fusion manner, thereby marking the view data of the target tissue at the corresponding position in the real-time ultrasound image S1 (Step 324) to form the fusion image. The fusion image may be the image B or image C in FIG. 7. The fusion display may be based on the registration of the three-dimensional model data and the real-time ultrasound image, which will not be described here again. For details, reference may be made to the description above.

In step 326 in FIG. 3, based on the displayed real-time ultrasound image, the processor may receive the ablation parameter or planned ablation path of at least one ablation needle. The ablation device may include at least one ablation needle. According to the relative fixed position relationship between the ablation needle and the ultrasound probe, the ablation needle may be displayed on the real-time ultrasound image, thereby determining the planned ablation path of the ablation needle based on the tracking positioning of the real-time ultrasound probe and the real-time ultrasound image. The ablation parameters mentioned herein may include at least one of ablation power, predicted working time and the number of ablation devices, etc.

For example, in one embodiment, the step 326 or the process of determining the planned ablation path on the real-time ultrasound image may be achieved by:

displaying the ablation device mark at the first position on the real-time ultrasound image according to the relative position of the ablation device with respect to the ultrasound probe, obtaining an adjustment instruction to the ablation device mark, adjusting the ablation device mark to the second position on the real-time ultrasound image according to the adjustment instruction and recording the association information between the positions of the ablation device mark and the real-time ultrasound image, the view data and/or the spatial orientation to obtain the planned ablation path. The planned ablation path may include at least the group of ablation parameter information of at least one ablation device corresponding to multiple positions.

In addition, in some embodiments, before determining the planned ablation path on the real-time ultrasound image or before step 326, the following steps may further be included.

First, the ablation parameters of the ablation device may be obtained. The ablation parameters may include at least one of the ablation power, the predicted working time and the number of the ablation devices, etc. For example, an input window or a pull-down menu for the ablation parameters may be provided on the display interface for the user to input the selection instructions to set the ablation parameters.

Thereafter, the predicted ablation area may be obtained according to the ablation parameters. The predicted ablation area may be displayed on the real-time ultrasound image to determine the planned ablation path. The displayed predicted ablation area may change as the position of the ablation device mark changes.

Based on the change in the position of the ablation device mark input by the user on the real-time ultrasound image and the selection instruction for the ablation parameters, the user can be enabled to set the planned ablation path in the current mode when examining the patient based on the currently obtained real-time ultrasound image.

In one embodiment, in order to achieve the comparison of two planned ablation paths, the previously stored planned ablation path may be displayed to represent the difference between the current planned ablation path and the previously planned ablation path. For example, displaying the planned ablation path on the display screen may include the following steps. The processor may obtain a first planned ablation path of at least one ablation needle. For example, the first planned ablation path may be a pre-stored planned ablation path. The planned ablation path in this embodiment may also include a second planned ablation path obtained by the processor based on the real-time ultrasound image obtained when the ultrasound probe is at the current orientation during the process of determining the planned ablation path on the real-time ultrasound image. The processor may receive the second planned ablation path of at least one ablation needle based on the process of determining the planned ablation path on the real-time ultrasound image. For example, the second planned ablation path may be the planned ablation path of the at least one ablation needle input by the user when performing the ablation planning based on the currently obtained real-time ultrasound image. The second planned ablation path may be input by the user on the real-time ultrasound image through the human-machine interactive device, such as being set on the displayed real-time ultrasound image above. Through the process shown in FIG. 3, the planned ablation needle path or the like may be set, and the position of a certain tissue may be found in the human body based on the real-time ultrasound image to determine the needle insertion position and set the predicted needle insertion path. Based on the real-time ultrasound image, the user may mark and/or set the puncture guide line angle of the ablation needle, the puncture guidance line direction, the ablation needle insertion path, the ablation path depth, the ablation power, the number of ablation needles, the predicted working time, the predicted ablation range (or the ablation area) or other planned ablation path information, so as to achieve the ablation planning. By simultaneously displaying the first planned ablation path and the second planned ablation path on the display screen, the difference between them may be saved, recorded, and/or marked to prompt the user. The first planned ablation path may be obtained with the current system, or may be obtained with other system.

The "first" and "second" above are only used for distinguishing the planned ablation paths in text, but will not change the content of the ablation path itself. That is, the first planned ablation path and the second planned ablation path may both include at least one of the puncture guide line angle, the puncture guide line direction, the ablation needle inserting path, the ablation path depth, the ablation power, the number of ablation needles, the predicted working time and the predicted ablation range (or the ablation area), etc.

In one embodiment, the ablation path may be an ablation path for at least one insertion of at least one ablation needle, or ablation paths for at least one insertion of multiple ablation needles.

For example, in one embodiment, receiving the ablation path of the at least one ablation needle in step 326 above may include receiving the first planned ablation path of the first ablation needle and receiving the second planned ablation path of the second ablation needle. The first ablation needle and the second ablation needle may respectively correspond to two different ablation needles, or may respectively correspond to two insertions of the same ablation needle.

In step 328 in FIG. 3, the processor may determine the predicted ablation area according to the ablation path or ablation parameters above. Based on the ablation path above, the tissue area containing the target tissue and the safety boundary may be determined (reference may be made to the description above). The user may set the simulation ablation rang needle (Si, the i-th ablation) of the ablation needle in a ablation path of a given ablation power and working time according to clinical experience or the working parameters provided by the manufacturer. The predicted ablation range of most ablation needles may be an ellipsoid. Therefore, only the long axis length and the short axis length of the ellipsoid need to be set. Based on the clinical experience, the user may pre-set the simulation ablation areas of various ablation needles in different powers and working hours in the system to construct a simple database. In clinical applications, the user may directly obtain the ablation parameters (ablation range and set power, etc.) which have been set, and then obtain the predicted ablation area according to the ablation path input by the user. In one embodiment, the embodiment may further include establishing an association relationship database between the predicted ablation path or the ablation parameters and the predicted ablation area according to the correspondence between the predicted ablation path or the ablation parameters and the predicted ablation area. Thereafter, based on the ablation path input by the operator (or the user), the predicted ablation area may be determined by searching the association database. For example, according to the first planned ablation path obtained in step 326, the first predicted ablation area may be obtained. According to the second planned ablation path, the second predicted ablation area may be determined. The first ablation path and the second ablation path have already been described above, and will not be described here again. It can be seen that, in this embodiment, the first predicted ablation area may be the planned ablation path determined according to the currently obtained real-time ultrasound image, while the second predicted ablation area may be the obtained planned ablation path pre-stored. Alternatively, the first predicted ablation area may be the planned ablation path of the first ablation device determined according to the currently obtained real-time ultrasound image, while the second predicted ablation area may be the planned ablation path of the second ablation device determined according to the currently obtained real-time ultrasound image. The first ablation device and the second ablation device may be different parts of multiple ablation devices (e.g., multiple ablation needles) used in a single ablation plan.

In step 330 in FIG. 3, the processor may output the predicted ablation area. Several ways for outputting the predicted ablation area will be provided below.

In the first way, the predicted ablation area may be marked on the real-time ultrasound image (step 330 in FIG. 3). For example, in one example, the first predicted ablation area and the second predicted ablation area may be marked on the real-time ultrasound image. For example, as shown in image B in FIG. 7, the area 731 is the second predicted ablation area, and the area 733 is the first predicted ablation area. Line 732 represents the ablation needle. By the way of the image B, the correspondence between the planned ablation range and the current ablation range obtained according to the real-time ultrasound image may be visualized more clearly.

In the second way, the overlapping relationship between the three-dimensional volume and the predicted ablation area may be calculated and output (step 332 and step 334 in FIG. 3). The three-dimensional volume may include the range encompassed by the safety boundary. As shown in the image B in FIG. 7, the overlapping relationship between the first predicted ablation area and/or the second predicted ablation area and the three-dimensional volume 734 may be respectively calculated to obtain corresponding calculation results so as to quantify the relationship between the view data of the target tissue and the ablation range, thereby more accurately comparing the planned ablation range and the current ablation range obtained according to the real-time ultrasound images. The first planned ablation path, which is a pre-stored planned ablation path, may also be an ablation plan obtained based on static three-dimensional data in a traditional manner. With the methods proposed in this embodiment, the ablation plan obtained by the traditional methods and the ablation plan obtained based on the real-time scanning can be effectively compared. Therefore, the surgical accuracy can be increased, and the user experience can be improved.

In the third way, the position relationship between the ultrasound probe and the real-time ultrasound image may be drawn in the fusion image, and the predicted ablation area may be marked at the corresponding position in the fusion image. Referring to image C in FIG. 7, the position relationship between the ultrasound probe icon 721 and the real-time ultrasound image 722 is drawn in the fusion image (image C), and the predicted ablation area 723 is marked at the corresponding position in the fusion image.

In the embodiment of displaying the actual ablation area, the three ways above may also be used. The processor may output the predicted ablation area through one or more of the three ways above.

In addition, in the embodiments above, by receiving the second planned ablation path of the at least one ablation needle when the ultrasound probe is in the current orientation to determine the second predicted ablation area, the user may perform the ablation planning settings in this way. For example, in one embodiment, based on the embodiment shown in FIG. 3, the planned ablation path in step 326 in FIG. 3 may be the second planned ablation path of the at least one ablation needle input by the user when the user performs the ablation planning based on the currently obtained real-time ultrasound image. Thereafter, in step 336, the real-time ultrasound image, the spatial orientation information and the second planned ablation path obtained when the ultrasound probe is located at each orientation in the magnetic field may be associated and recorded, and the previously stored first ablation path may be obtained to form the ablation planning data and use this first ablation path in the following ablation planning process (see FIG. 4). Returning to the step 310, based on the different orientations of the ultrasound probe, the ablation paths in different orientations may be set, thereby forming the planned paths of the ablation needle and completely displaying the planning arrangement of the ablation surgery and the prediction of the ablation effect.

As can be seen from the description above, in the present embodiment, the positioning device may be fixed on the ultrasound probe. Therefore, it can be tracked without the needle. During the puncture planning before the surgery, the path planning of the ablation device may be simulated based on the relative position of the ablation device (such as the ablation needle) with respect to the probe using the devices and methods above, instead of performing the planning based on the actual ablation needle inserted into the examined body, thereby avoiding increasing the patient's pain during preoperative planning and reducing the preoperative costs. The relative position of the ablation device (such as the ablation needle) with respect to the probe may include the distance between the end of the ablation device (such as the tip of the ablation needle) and the ultrasound probe, the installation angle between the ablation device (such as the ablation needle) and the ultrasound probe, and so on. In one embodiment, the steps 280 and 290 or the steps 326 and 330 may further include the following steps:

displaying the ablation device mark of the ablation device on the fusion image according to the relative position of the ablation device with respect to the ultrasound probe, and setting the ablation path of the ablation device according to the real-time ultrasound image and the ablation device mark.

For example, the ablation insertion path of the ablation device such as the ablation needle or the like may be planned by adjusting the position of the ablation device mark on the real-time ultrasound image on the fusion image. The position of the ablation device mark on the real-time ultrasound image may be adjusted according to the adjustment instruction input by the user received by the processor so as to obtain a part of the second planned ablation path. In one embodiment, in step 336, when associating the real-time ultrasound image, the spatial orientation information and the planned ablation path when the ultrasound probe is located at each orientation in the magnetic field may be achieved by the following methods, and the correspondence between the simulation mark representing the ablation device, the real-time ultrasound image and the spatial orientation information may be recorded, thereby forming the preoperative data for ablation planning. In this process, it is possible to achieve the ablation planning without installing the ablation device on the ultrasound probe, such as the ablation needle, thereby reducing patient pain.

Figure 4:
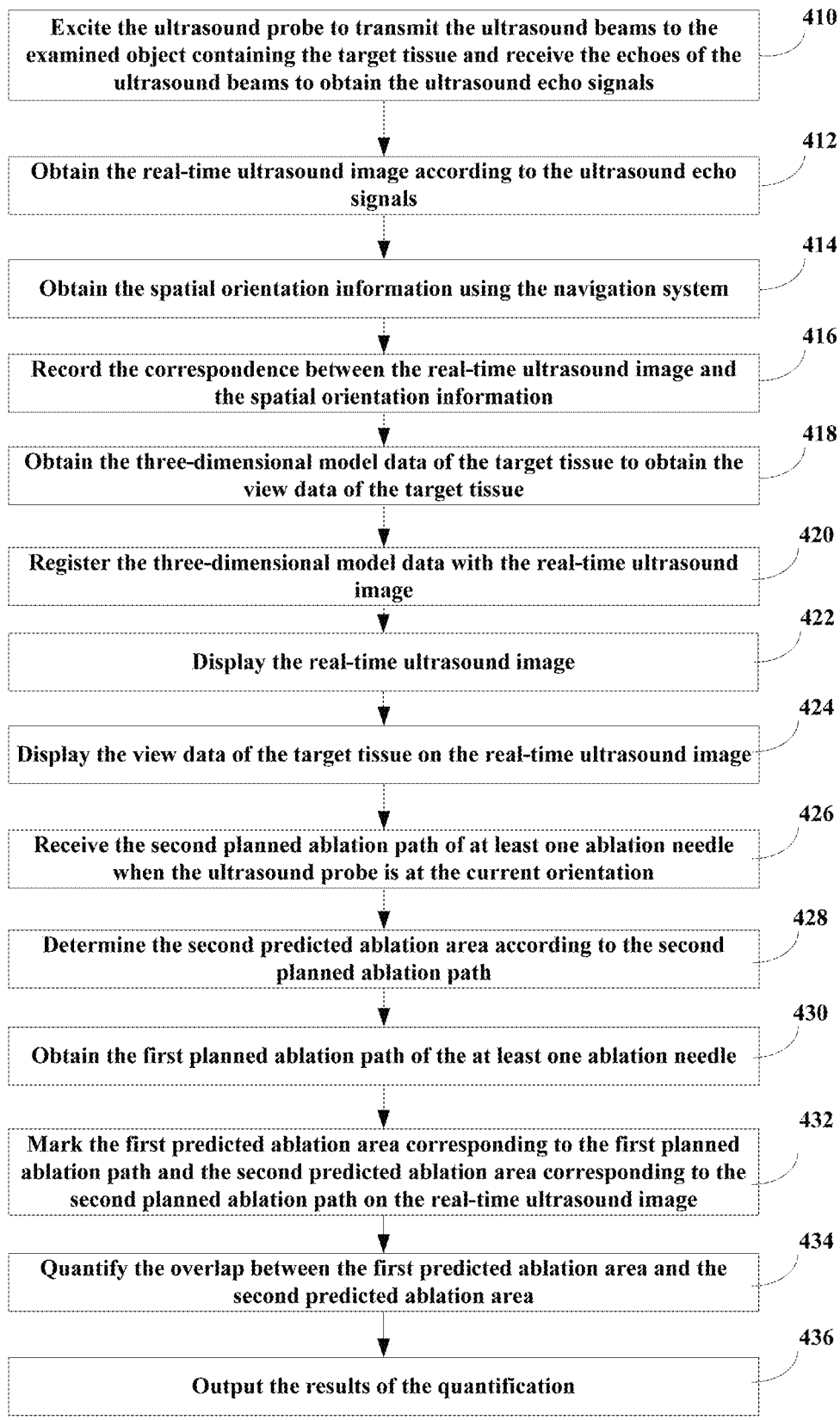
FIG. 4 is a schematic flowchart of the device in FIG. 1 in one embodiment.

Based on the foregoing, as shown in image B in FIG. 4 and FIG. 7, when using the device of the present embodiment, the planning evaluation between the traditional planned path and the real-time planned path may also be performed so as to provide the doctor with corresponding reference for making a more precise planned path. FIG. 4 shows the process of one embodiment. In the embodiment shown in FIG. 4, the planned ablation range and the ablation range obtained based on the current real-time ultrasound image may be compared.

In step 410 and step 412 in FIG. 4, the transmitting circuit and the receiving circuit may excite the ultrasound probe to transmit ultrasound beams to the examined object containing the target tissue and receive the echoes of the ultrasound beams to obtain the ultrasound echo signals. The image processing unit may obtain real-time ultrasound image according to the ultrasound echo signals. For details, reference may be made to steps 210 and 220 or steps 310 and 312 described above. In step 414, the navigation system may be used to obtain the spatial orientation information of the positioning device. For details, reference may be made to step 230 or step 314 described above. In step 416, the processor may associate and record the correspondence between the real-time ultrasound image and the spatial orientation information. For details, reference may be made to step 230 or step 316 described above. By performing step 416, each frame of real-time ultrasound image and the spatial orientation of the ultrasound probe in the magnetic field when acquiring such frame of ultrasound image may be obtained. In steps 418 and 420, the view data of the target tissue may be obtained according to the three-dimensional model of the target tissue, and the three-dimensional model data may be registered with the real-time ultrasound image. For details, reference may be made to steps 250 and 260 or steps 318 and 320 above. In step 422, at least one frame of real-time ultrasound image may be displayed on the display screen, and the view data of the target tissue may be marked at the corresponding position in the real-time ultrasound image (step 424) so as to form the fusion image. For details, reference may be made to step 270 or steps 322 and 324 above.

Next, in step 426 in FIG. 4, the processor may receive the second planned ablation path of at least one ablation needle when the ultrasound probe is in the current orientation. In step 428, the processor may determine the second predicted ablation area according to the second planned ablation path.

In step 430 in FIG. 4, the processor may obtain the pre-stored first planned ablation path of the at least one ablation needle, and determine the first predicted ablation area according to the first planned ablation path. In step 432, the first predicted ablation area and the second predicted ablation area may be marked at the corresponding positions in the real-time ultrasound image, such as 733 and 731 in image B in FIG. 7.

In step 434 in FIG. 4, the processor may quantify the overlapping between the first predicted ablation area and the second predicted ablation area, and in step 436, the processor may output the quantization results of the overlapping between the first predicted ablation area and the second predicted ablation area. Regarding the detailed descriptions of the first predicted ablation area and the second predicted ablation area in steps 426 to 436, reference may be made to the description of steps 326 to 330 above. Referring to the related description above, the first ablation path of the at least one ablation needle may be the second ablation path obtained using the methods shown in FIG. 3, or the planned ablation path obtained by performing ablation planning based on offline ultrasound images. The output of the quantization results of the overlapping between the first predicted ablation area and the second predicted ablation area may be graphs as shown in FIG. 7 or a ratio displayed by text.

As shown in image C in FIG. 7, the processor may display the spatial position relationship between the probe icon 721, the ablation device mark 725, and the real-time ultrasound image obtained at the current time in the same window or the same fusion image. Furthermore, the view data (724) of the target tissue may be displayed in the same window or the same fusion image. Based on the registration result, the acquisition angle of the ultrasound image can be observed from the perspective of the actual spatial angle, thereby guiding the user to plan the ablation path.

In some embodiments, determining the planned ablation path on the real-time ultrasound image may further include the following steps. The pre-stored planned ablation path may be imported into the real-time ultrasound image, such as the second planned ablation path. As the position of the ultrasound probe changes, the input for changing the imported planned ablation path may be obtained based on the changed real-time ultrasound image. For example, based on the obtaining of the first planned ablation path, the planned ablation paths may be respectively obtained for the at least one frame of real-time ultrasound image obtained by the ultrasound probe at different times. Based on the correction result of the second planned ablation path, the first planned ablation path may be obtained, thereby obtaining the input for changing the second planned ablation path. The change data of the planned ablation path may be obtained according to the input for changing.

In some embodiments, the planned ablation path or the change data for the planned ablation path may be stored so as to form a planned ablation database for the target tissue. The information recorded in the database may include at least one of the planned ablation path and the ablation parameters. The information recorded in the database may also include the association relationship between one of the planned ablation path and ablation parameters and one of the spatial orientation information, the real-time ultrasound image and the view data of the target tissue. It is convenient to import the planned ablation path. Alternatively, the corresponding planned ablation path may be directly imported according to the ablation parameters input by the user.

3. The embodiments and the simulation planning device may also be suitable for the planning of multi-needle ablation. For details, reference may be made to the process shown in FIG. 6.

Figure 6:
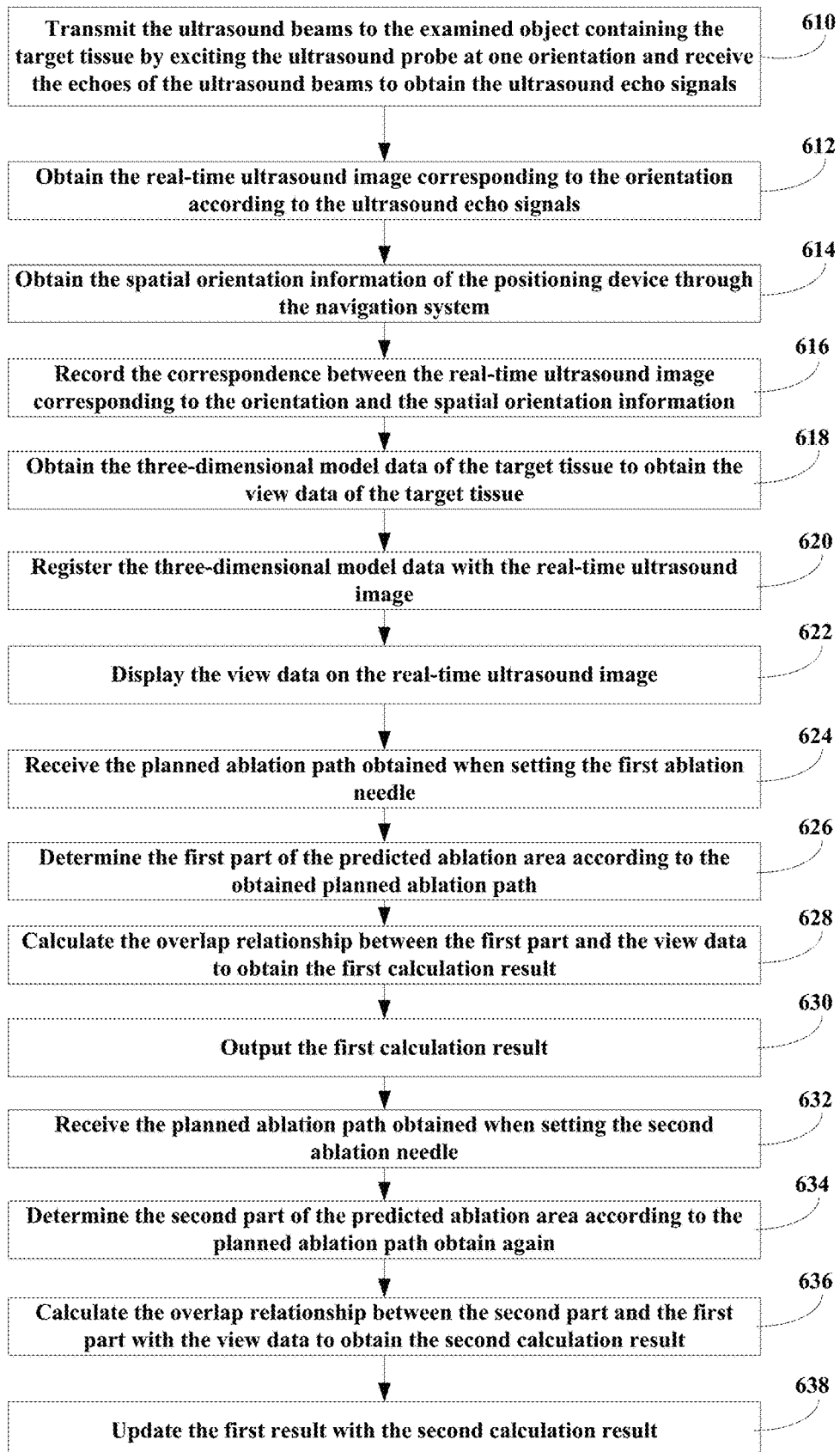
FIG. 6 is a schematic flowchart of the device in FIG. 1 in a multi-frame joint ablation mode.

In step 610 and step 612 in FIG. 6, the transmitting circuit and the receiving circuit may excite the ultrasound probe located in one orientation to transmit the ultrasound beams to the examined object containing the target tissue and receive the echoes of the ultrasound beams to obtain the ultrasound echo signals. The image processing unit may obtain the real-time ultrasound image corresponding to the orientation according to the ultrasound echo signals. For specific implementation of step 610 and step 612, reference may be made to step 210 and step 220 or step 410 and step 412 described above.

In step 614 in FIG. 6, the navigation system may be used to obtain the spatial orientation information of the positioning device. For the specific implementation of step 614, reference may be made to step 230 or step 414 described above. In step 616 in FIG. 6, the processor may record the correspondence between the real-time ultrasound image corresponding to the orientation and the space orientation information, thereby obtaining the mapping relationship between the image space coordinate system and the magnetic field space coordinate system. For the specific implementation of step 616, reference may be made to step 240 or step 416 described above. By performing step 616, each frame of real-time ultrasound image and the orientation of the ultrasound probe in the magnetic field when acquiring such ultrasound image may be obtained. In step 618 and step 620 in FIG. 6, the processor may obtain the view data of the target tissue through the three-dimensional model of the target tissue. The view data may include the three-dimensional volume information. For details, reference may be made to the relevant description above. The three-dimensional model data may be registered with the real-time ultrasound image so as to obtain the mapping relationship between the three-dimensional model data and the image space coordinate system. Based on the mapping relationships, the view data of the target tissue, the ultrasound probe and the real-time ultrasound image may be mapped to the same coordinate system to obtain the fusion image. For specific implementation of step 618 and step 620, reference may be made to steps 250 and 260 or steps 418 and 420 described above. In step 622 in FIG. 6, the processor may display the real-time ultrasound image and display the view data of the target tissue on the real-time ultrasound image. For example, the three-dimensional or two-dimensional image data of the target tissue may be marked at the corresponding position on the real-time ultrasound image, or an icon of the target tissue may be marked at the corresponding position on the real-time ultrasound image, so as to obtain at least one fusion image. For the specific implementation of step 622, reference may be made to step 270 or steps 422 and 424 described above.

In step 624 in FIG. 6, the processor may receive the planned ablation path obtained by setting the first ablation needle according to the real-time ultrasound image. In step 626 in FIG. 6, the processor may determine the first part of the predicted ablation area according to the planned ablation path. In step 628 in FIG. 6, the processor may calculate the overlapping relationship between the first part above and the view data to obtain a first calculation result. In step 630 in FIG. 6, the processor may output the first calculation result. In step 632 in FIG. 6, the processor may receive the planned ablation path obtained by setting the second ablation needle according to the real-time ultrasound image. In step 634 in FIG. 6, the processor may determine the second part of the predicted ablation area according to the planned ablation path obtained again. In step 636 in FIG. 6, the processor may calculate the overlapping relationship between the second part and the first part with the view data to obtain a second calculation result. In step 638 in FIG. 6, the processor may update the outputted first calculation result with the second calculation result. The first ablation needle and the second ablation needle may be two different ablation needles, or correspond to two insertions of the same ablation needle. Therefore, the obtained two planned ablation paths here may be two planned ablation paths obtained respectively by adjusting the first ablation needle and the second ablation needle, or be two planned ablation paths obtained by adjusting the same ablation needle two times. In one embodiment, the first ablation needle and the second ablation needle are two different ablation needles. With the methods of the present embodiment, the process of three-dimensional volume ablation planning and processing during the multi-needle ablation may be presented, and the corresponding proportion of the ablation range may be gradually shown, so as to provide good data support for the user. The traditional human judgment may be converted into computer-aided judgment, which makes the ablation planning more scientific and accurate. The first calculation result and the second calculation result may be outputted by rendering on the fusion image or by text, and may also be updated according to the ablation planning process.

The process of setting the simulation ablation needle path may be shown in FIG. 3. First, the operator may move the probe on the surface of the patient to find the appropriate position and direction according to the envisaged intervention plan to obtain the desired ultrasound section image of the target tissue, that is, the predicted insertion position of the ablation needle. In connection with the puncture frame and the puncture guide line, the angle of the probe or the angle of the puncture guide line may be adjusted such that the puncture guide line passes through the target tissue (as shown in image B in FIG. 7). The ablation path such as the depth of the needle, etc. may be adjusted through the ultrasound control panel knobs, buttons or touch screen, etc. of the human-machine interactive device. The screen may display the simulated ablation needle entering the target tissue (such as a certain tissue area) along the puncture guide line. When the simulation path is determined, a simulated ellipsoid ablation area (as indicated by 723 in image C in FIG. 7) may be displayed at the tip of the simulated ablation needle. When the simulation path is determined, the system may automatically store the currently set ultrasound section, the puncture guide line angle, the simulation ablation needle path, the path depth, the simulated ablation area or other information regarding the ablation path, and the real-time ultrasound image. Since the magnetic positioning device is fixed on the probe, the physical space mapping matrix Pi of the space represented by the positioning device on the probe with respect to the magnetic field may be obtained in real time. Through the mapping matrix Pi, the coordinates of the simulated ablation area in the ultrasound image space may be mapped to the physical space where the magnetic field is located, thereby obtaining the coordinates of the simulated ablation area in the magnetic field space coordinate system, namely Pi*Si. When multi-needle ablation is used (one needle performing the ablation for multiple times or multiple needles performing the ablation at the same time), the above steps may be repeated to set multiple simulation ablation needles (for details, reference may be made to the flow shown in FIG. 6). The multi-needle ablation area B may be represented by the formula:

$$B = \bigcup_{i=1 \ldots n} (P_i * S_i) \text{ (Union of multiple ablation areas)}.$$

When $$T_s \subset \bigcup_{i=1 \ldots n} (P_i * S_i),$$

the target tissue (such as a certain tissue (safety boundary)) is completely ablated. In the process of multi-needle ablation, the percentage of the residual tissue after the ablation may be displayed in real time to quantify the overlapping relationship between the three-dimensional volume and the predicted ablation area, that is, the percentage of the ablation residual area of the target tissue (such as a certain tissue (safe boundary)) to the whole three-dimensional volume. The real-time percentage A at the $k^{th}$ ablation may be expressed as $$A = \left(T_s - T_s \cap \bigcup_{i=1 \ldots k} (P_i * S_i)\right)/T_s,$$

where the $k^{th}$ ablation may be the $k^{th}$ ablation of one ablation needle or the ablation the $k^{th}$ ablation needle. The parameter A may quantitatively display the current ablation effect in real time. The parameter A may be used in steps 332 and 334 above, and may also be used in the calculation of the first calculation result and the second calculation result in FIG. 6. It may also be possible to calculate the percentage of the ablated volume and calculate the minimum number of the ablation needles, that is, calculate how many predicted ablation areas can form the area $$\bigcup_{i=1 \ldots n} (P_i * S_i)$$

containing the certain tissue area Ts.

In the embodiments shown in FIGS. 3 to 6, the real-time images, the multi-needle ablation areas and the target tissue may be displayed on the display screen. The information to be displayed may include the relationship between the two-dimensional images, three-dimensional image data and the three-dimensional shape target (i.e. the three-dimensional volume). FIG. 7 shows a multi-window linkage display platform. One of the windows may be used to display the overlap area of the real-time two-dimensional image with the simulated ablation area and the three-dimensional volume in a fusion manner. That is, the overlap area of the simulated ablation area and a certain tissue (safe boundary) with the real-time image may be superimposed and displayed on the real-time image by colors (as shown in the image A at the upper right corner in FIG. 7). Three-dimensional display technologies such as volume rendering (VR) or surface rendering (SSD), etc. may also be used to display the real-time images, the multi-needle ablation areas or the target tissue, etc. (as shown in the image C at the lower left corner in FIG. 7).

With the device of the present disclosure, the operator may be guided to perform the interventional ablation along the set path. The operator may select a path set during the simulation to obtain the ablation parameters of such path, including the probe orientation information Ri, the mapping matrix Pi, the view data of the target tissue (such as the three-dimensional volume data Si), etc. The real-time probe orientation information Rk, the mapping matrix Pk and the three-dimensional volume data Sk at the current time may also be obtained. Based on the relationship between the two sets of data, the operator may be guided to perform the ablation along the path set by the simulation. For example, using the current spatial orientation Rk of the ultrasound probe and the probe spatial orientation information Ri in the pre-stored ablation path (such as the ablation needle insertion path), the quantitative parameters such as the distance and angle between the current probe and the simulated probe may be calculated. In the three-dimensional display system, the relative positions of the two probe models may be displayed directly on the fusion image (e.g., at the lower left window in FIG. 7, two probe models are displayed, where one (721) may represent the current position of the ultrasound probe and the other represent the position of the simulated probe). It may also be possible to display in real time the overlap rate $((P_i * S_i) \cap (P_k * S_k)/(P_i * S_i)$ of the simulated predicted ablation area with the current predicted ablation area corresponding to the probe, where Pi*Si may be used to obtain the registered three-dimensional volume. Alternatively, as shown in the image B in the upper right window in FIG. 7, the overlap area of the real-time image with the simulated ablation area and the predicted ablation area may be displayed in a fusion manner. For example, the simulated predicted ablation area and the current predicted ablation area may be marked in different colors on the real-time image.

Based on the methods and systems for planning ablation path provided in the embodiments above, in one embodiment, an ultrasound device for guiding planning may be proposed to display the predicted ablation effect of multiple-needle ablation, in which the probe orientation, the actual needle insertion depth and the needle insertion angle when the doctor performs the needle insertion during the actual interventional ablation may be recorded. It can be seen from the foregoing that a planning mode (such as the simulation system mode mentioned below) has been established in the ultrasound system.

In some embodiments, the real-time ultrasound image data that changes as the position of the ultrasound probe changes may be obtained, and the planned ablation path may be obtained according to the real-time ultrasound image that changes, thereby determining the planned ablation path on the real-time ultrasound image. For example, in one embodiment, after starting or entering the planning mode (including the navigation system mode), the ultrasound probe may be moved to perform the real-time imaging on the target tissue so as to obtain the first real-time ultrasound image data. For example, the imaging may be performed on a certain section of the target tissue to obtain the ultrasound section image. The view data of the target tissue may be obtained and displayed on the displayed first real-time ultrasound image data to guide the ablation needle into the target tissue based on the ultrasound image. According to the ablation needle insertion path and the ablation path depth, the predicted simulation ablation range may be set, thereby determining a part of the planned ablation path. The position change information of the ultrasound probe may be obtained to obtain the second real-time imaging data at another position of the target tissue, and another part of the planned ablation path may be determined on the second real-time ultrasound image data, thereby forming the data set of the planned ablation path. Based on the data set of the planned ablation path, the planned ablation paths corresponding to the ultrasound probes moved at least twice may be obtained. According to the planned ablation paths, at least two predicted ablation areas at the corresponding positions may be obtained. The obtained predicted ablation areas corresponding to the ultrasound probe moved at least twice may both be displayed on the real-time ultrasound image to form a joint predicted ablation area. For example, the ultrasound probe may be moved to select another position to guide the ablation needle to be inserted into the tissue target, and the joint predicted ablation area $$\bigcup_{i=1\ldots n}(P_i * S_i)$$

may be displayed.

Thereafter, the ultrasound contrast enhanced imaging mode may be selected, in which the ultrasound contrast agent may be injected and the contrast enhanced image may be obtained. During the perfusion of a certain tissue, the probe may be swung in a direction to obtain an image data loop including the image data of the tissues containing the certain tissue. The image data loop may be stored. The joint predicted ablation area and the contrast enhanced images may be displayed in a fusion manner. Based on the probe orientation information (the mapping matrix Pi) corresponding to each frame of image in the stored image data loop, each frame of image may be mapped to the magnetic field space coordinate system, and the overlap area of the contrast enhanced image with the joint predicted ablation area may be displayed. That is, the overlap area of the simulated ablation area and the certain tissue (safety boundary) with the real-time image may be superimposed and displayed on the real-time image with colors (as shown in image B at the upper right corner in FIG. 7). It can be determined whether the ablation needle currently set can complete the ablation by observing whether the contrast enhanced section images of the certain tissue is different positions are included in the colored joint predicted ablation area. In the present embodiment, in addition to the ultrasound contrast enhanced imaging mode, other ultrasound imaging mode may also be used.

4. Based on the ultrasound systems and ultrasound imaging methods above, an ultrasound system may also be provided which can compare and verify the predicted ablation area with the actual ablation area. In one embodiment, the ultrasound system may include an ultrasound probe, an ablation device, a transmitting circuit and a receiving circuit, an image processing unit, a navigation system, a display screen, a memory, and a processor. The ablation device may be fixed on the ultrasound probe. For example, the ablation device and the ultrasound probe may be fixed at a preset angle. The transmitting circuit and the receiving circuit may excite the ultrasound probe to transmit ultrasound beams to the examined object containing a target tissue and receive the echoes of the ultrasound beams to obtain the ultrasound echo signals. The image processing unit may obtain the real-time ultrasound image data according to the ultrasound echo signals. The navigation system may include a positioning device. The positioning device may be fixed on the ultrasound probe, and the spatial orientation information of the positioning device fixed on the ultrasound probe may be obtained through the navigation system. The memory may store the computer program which will be run in the processor. The processor may execute the program to perform:

recording the real-time ultrasound image data and the spatial orientation information corresponding to the real-time ultrasound image data;

displaying the real-time ultrasound image data;

obtaining the actual ablation path of the ablation device according to the real-time ultrasound image data and spatial orientation information;

obtaining the pre-stored planned ablation path;

displaying the planned ablation path on the real-time ultrasound image data;

displaying the actual ablation path information on the real-time ultrasound image data; and storing the planned ablation path and actual ablation path information.

In this embodiment, the pre-stored planned ablation path may be obtained by the methods above and reference may be made thereto.

The process of obtaining the actual ablation path information of the ablation device according to the real-time ultrasound image data and the spatial orientation information may include obtaining the position information of the ablation device inserted into the target tissue by segmentation based on the real-time ultrasound image data and/or obtaining the user input information based on the real-time ultrasound image, thereby determining the actual ablation path. In addition, based on the spatial orientation information, or in connection with the actual fixing angle between the ablation device and the ultrasound probe, the information such as the actual needle insertion angle and direction, etc. of the ablation device may be obtained, thereby determining the actual planned ablation path. The ablation path may include one of the ablation guide direction, the ablation path depth, the predicted ablation area and the ablation parameter, etc. The ablation parameter may include at least one of the ablation power, the predicted working time and the number of the ablation devices, etc. In addition, the information such as the ablation parameter corresponding to the actual ablation path, etc. may be determined on the real-time ultrasound image. For example, the user's input information may be obtained based on the real-time ultrasound image, thereby determining the actual ablation path. Regarding this process, reference may be made to the process of determining the planned ablation path on the real-time ultrasound image above. The methods are similar and will not be repeated here.

Regarding displaying the planned ablation path on the real-time ultrasound image data, reference may be made to the embodiments shown in FIG. 7. For example, the ablation device mark and the predicted ablation area may be marked on the real-time ultrasound image data to represent the planned ablation path. The predicted ablation area may be displayed at the end of the ablation device mark. When the position of the ablation device mark on the real-time ultrasound image changes, the predicted ablation area will also change correspondingly. When the orientation of the ultrasound probe changes, the ablation device mark and/or the predicted ablation area will also change correspondingly.

Similarly, when displaying the actual ablation path information on the real-time ultrasound image data, the actual ablation device mark and/or the actual ablation area may also be marked to represent the actual ablation path. The actual ablation area may be displayed at the end of the actual ablation device mark. When the position of the actual ablation device mark on the real-time ultrasound image changes, the actual ablation area will change accordingly. When the orientation of the ultrasound probe changes, the actual ablation device mark and/or the actual ablation area will also change correspondingly.

The actual ablation device mark and the ablation device mark above may be differently displayed by color and/or line natures or other characteristics. Similarly, the actual ablation path and the planned ablation path may also be differently displayed by color and/or line natures or other characteristics.

When storing the planned ablation path and the actual ablation path information, it may include recording the difference between the actual ablation path and the planned ablation path. For example, the positions and/or the position difference of the ablation device corresponding to the planned ablation path and the actual ablation device in the same frame of ultrasound images may be recorded, the difference in the needle insertion angles of the ablation device corresponding to the planned ablation path and the actual ablation device may be recorded, the difference between the predicted ablation area corresponding to the planned ablation path and the actual ablation area corresponding to the actual ablation path may be recorded, and so on.

When storing the planned ablation path and the actual ablation path information, the corresponding real-time ultrasound image data may also be stored. Alternatively, when storing the planned ablation path and the actual ablation path information, the corresponding real-time ultrasound image and the view data of the target tissue may also be stored.

In some embodiments, when performing the program, the processor may obtain the pre-stored planned ablation path and display the planned ablation path on the real-time ultrasound image data by:

obtaining the three-dimensional model data of the target tissue to obtain the view data of the target tissue;

registering the three-dimensional model data with the real-time ultrasound image data according to the recorded real-time ultrasound image data and the spatial orientation information;

displaying the real-time ultrasound image and the view data of the same target tissue on the display screen in a fusion manner according to the result of the registration;

obtaining the pre-stored planned ablation path; and displaying the planned ablation path on the fusion image of the real-time ultrasound image and the view data.

For details of these steps, reference may be made to the related description of FIG. 1 to FIG. 7 above, which will not be described here again.

In some embodiments, the planned ablation path, the actual ablation path and the difference between the planned ablation path and the actual ablation path may be displayed on the real-time ultrasound image data. For example, the position difference between the ablation device corresponding to the planned ablation path and the actual ablation device, the difference between the needle insertion angles of the ablation device corresponding to the planned ablation path and the actual ablation device and the difference between the predicted ablation area corresponding to the predicted ablation path and the actual ablation area corresponding to the actual ablation path, etc. may be displayed on the real-time ultrasound image data. In one embodiment, the processor may calculate the overlap relationship between the predicted ablation area corresponding to the planned ablation path and the actual ablation area corresponding to the actual ablation path to quantify the overlap relationship, and display the quantified overlap relationship on the display screen. In addition, in the process of quantifying the overlap relationship, the overlap relationship between the predicted ablation area or the actual ablation area and the view data of the target tissue may further be calculated to quantify such overlap relationship, and be displayed on the display screen. In addition to displaying the overlap relationship between the ablation areas, in other embodiments, the overlap relationship between the planned ablation path and the actual ablation path may also be displayed, such as the overlap relationship between the needle insertion angles or the overlap relationship between the positions of the ablation devices, etc.

As shown in FIG. 5, in one embodiment, after the ablation operation is completed, the contrast agent may be injected and the contrast enhanced imaging mode may be performed. After the ablation, there is no contrast perfusion in the ablated area in the contrast enhanced ultrasound image, which was obviously compared with the surrounding normal tissues. The contrast enhanced images obtained after the ablation may also be reconstructed into three-dimensional ultrasound contrast enhanced data using navigation-based free-hand reconstruction algorithms. By comparing the joint predicted ablation area and the three-dimensional ultrasound contrast enhanced data, the difference between the simulation system and the actual ablation effect. In other embodiments, other imaging modes may also be used, such as the elastography mode or the like. Therefore, in one embodiment, the three-dimensional ultrasound image data at the position of the target tissue after the ablation may be obtained displayed, and the planned ablation path may be displayed on the three-dimensional ultrasound image data. Regarding the reconstruction of the three-dimensional ultrasound image data, reference may be made to the method for reconstructing the contrast enhanced image above, which will not be described in detail here. The planned ablation path may be displayed on the three-dimensional ultrasound image data in a stereoscopic display manner. For example, as shown in image C in FIG. 7, the predicted ablation area three-dimensionally displayed on the three-dimensional ultrasound image data is an ellipsoidal. In addition to displaying the three-dimensional predicted ablation area, other information in the planned ablation path may also be displayed by marking the position of the ablation device, such as the needle insertion angle or guide angle, the needle insertion direction or guide direction, the depth of the needle insertion or the ablation path or other information.

The ultrasound guide system used in the clinical application of tissue ablation is described herein. The system can not only clinically verify the plan designed by the operator before the surgery, but also be used to estimate and evaluate the ablation effect of the ablation needle that has been inserted into the human body, as well as to evaluate and verify the actual ablation effect. For example, in one embodiment, the processor may also obtain the spatial orientation information of the ultrasound probe when the ultrasound probe is located at the current orientation to obtain the real-time position information, obtain the pre-stored spatial orientation information (which may be obtained from the pre-stored planning data) of the ultrasound probe when the ultrasound probe is in one of the orientations according to the real-time ultrasound image obtained when the ultrasound probe is in the current orientation to obtain the reference information, and display the real-time position information and the reference information simultaneously. As shown in the image C at the lower left of FIG. 7, two ultrasound probe positions are marked, where one is the position of the ultrasound probe generated in the ablation planning and the other is the current orientation of the ultrasound probe. This way, the operator can be prompted how to adjust the position of the ultrasound probe. For example, based on the real-time position information, the positional relationship between the ultrasound probe and the real-time ultrasound image may be marked in the fusion image, and the reference information may also be marked at the corresponding positions in the fusion image, thereby simultaneously displaying the real-time position information and the reference information.

FIG. 2 to FIG. 6 only provide certain kinds of execution orders of the steps. Various modifications may also be obtained by adjusting the execution order of the steps in FIG. 2 to FIG. 6. The steps above will not be limited to be executed in the order of FIG. 4. In the case of satisfying the basic logic, the steps may be replaced with each other or the order of execution may be changed. It may also be possible to execute the final one or more steps after one or more steps are repeatedly executed. These solutions are all the variations of the embodiments provided herein. Different steps may be completed by different execution bodies, as described above. Through the description of the embodiments above, those skilled in the art can clearly understand that the methods in the embodiments above can be implemented by software and a necessary general hardware platform, and can also be implemented by hardware. Based on this understanding, the essence or the part contributing to the prior arts of the technical solution of the present disclosure can be embodied in the form of a software product. The software product may be carried on a non-volatile computer-readable storage medium (such as ROM, magnetic disk, optical disk, hard disk or server cloud space), and may include multiple instructions which may enable a terminal device (which may be a mobile phone, a computer, a server or a network device, etc.) to implement the systems or methods in the embodiments of the present disclosure. For example, a computer-readable storage medium may be provided, which may store thereon a computer program. The computer program may be executed by the processor to at least implement the methods in the embodiments above.

Several examples have been described in the embodiments above, which is relatively specific and detailed. However, they should not be construed as limitations to the scope of the present disclosure. It should be noted that, for a person of ordinary skill in the art, several modifications and improvements can also be made without departing from the concept of the present disclosure, which all fall in the protection scope of the present disclosure. Therefore, the protection scope of the present disclosure shall be determined by the appended claims

The invention claimed is:

1. An ultrasound system for planning ablation, comprising:
   an ultrasound probe;
   a transmitting circuit which excites the ultrasound probe to transmit an ultrasound beam to an examined object containing a target tissue;
   a receiving circuit which receives echoes of the ultrasound beam to obtain an ultrasound echo signal;
   a navigation system comprising a positioning device fixed on the ultrasound probe;
   a display screen;
   a memory which stores a computer program; and
   a processor which, when executing the computer program:
   obtains real-time ultrasound image data of the examined object according to the ultrasound echo signal;
   obtains spatial orientation information of the positioning device through the navigation system;
   obtains three-dimensional model data of the target tissue;
   registers the three-dimensional model data with the real-time ultrasound image data according to the spatial orientation information to obtain a mapping relationship between the three-dimensional model data and the real-time ultrasound image data;
   displays, on the display screen, the real-time ultrasound image data and a view data of the target tissue obtained according to the three-dimensional model data registered with the real-time ultrasound image data in a fusion manner according to the mapping relationship to obtain a fusion image;
   determines a planned ablation path according to the fusion image, wherein the planned ablation path comprises a first predicted ablation area covering the view data of the target tissue;
   obtains a pre-stored second predicted ablation area, covering the view data of the target tissue, which is obtained when performing an ablation planning previously;
   marks the first predicted ablation area and the second predicted ablation area in the fusion image;

obtains and marks a difference between the first predicted ablation area and the second predicted ablation area, to compare the planned ablation path and a previous planned ablation path corresponding to the pre-stored second predicted ablation area; and displays the planned ablation path on the fusion image of the real-time ultrasound image data and the view data.

2. The system of claim 1, wherein the processor further displays an ablation device mark on the display screen.

3. The system of claim 2, wherein the processor further displays a probe icon representing the ultrasound probe on the display screen, wherein a display position of the probe icon changes with a change of the spatial orientation information.

4. The system of claim 1, wherein the planned ablation path further comprises at least one of an ablation guide direction or an ablation path depth.

5. The system of claim 1, wherein the processor determines the planned ablation path according to the fusion image by:
displaying an ablation device mark at a first position in the fusion image according to a relative position of an ablation device with respect to the ultrasound probe;
obtaining an adjustment instruction to the ablation device mark;
changing the first position of the ablation device mark in the fusion image to a second position according to the adjustment instruction; and
obtaining the planned ablation path according to the changed ablation device mark.

6. The system of claim 1, wherein, before determining the planned ablation path according to the fusion image, the processor further:
obtains an ablation parameter of an ablation device, wherein the ablation parameter comprises at least one of an ablation power, a predicted working time and a number of ablation devices; and
obtains the first predicted ablation area according to the ablation parameter, wherein the marked first predicted ablation area changes with a change of a position of an ablation device mark.

7. The system of claim 1, wherein displaying the real-time ultrasound image data and the view data of the target tissue comprises at least one of:
displaying a three-dimensional view data and a two-dimensional real-time ultrasound image of the target tissue;
displaying a three-dimensional view data and a three-dimensional real-time ultrasound image of the target tissue; or
displaying a two-dimensional view data and a real-time ultrasound image of the target tissue.

8. The system of claim 2, wherein the processor further performs at least one of:
displaying the first predicted ablation area following the ablation device mark on the fusion image;
drawing a probe icon and marking the first predicted ablation area at a corresponding position in the fusion image; or
marking an overlapping relationship between the first predicted ablation area and the second predicted ablation area according to the planned ablation path.

9. An ultrasound imaging method for planning ablation, comprising:
obtaining real-time ultrasound image data of an examined object containing a target tissue through an ultrasound probe;
obtaining spatial orientation information of a positioning device fixed on the ultrasound probe;
obtaining three-dimensional model data of the target tissue;
registering the three-dimensional model data with the real-time ultrasound image data according to the spatial orientation information to obtain a mapping relationship between the three-dimensional model data and the real-time ultrasound image data;
displaying the real-time ultrasound image data and a view data of the target tissue obtained according to the three-dimensional model data registered with the real-time ultrasound image data in a fusion manner according to the mapping relationship to obtain a fusion image;
determining a planned ablation path according to the fusion image, wherein the planned ablation path comprises a first predicted ablation area covering the view data of the target tissue;
obtaining a pre-stored second predicted ablation area, covering the view data of the target tissue, which is obtained when performing an ablation planning previously;
marking the first predicted ablation area and the second predicted ablation area in the fusion image;
obtains and marks a difference between the first predicted ablation area and the second predicted ablation area, to compare the planned ablation path and a previous planned ablation path corresponding to the pre-stored second predicted ablation area; and
displaying the planned ablation path on the fusion image of the real-time ultrasound image data and the view data.

10. The method of claim 9, further comprising displaying an ablation device mark.

11. The method of claim 10, wherein the method further comprises:
displaying a probe icon representing the ultrasound probe, wherein a display position of the probe icon changes with a change of the spatial orientation information.

12. The method of claim 9, wherein the planned ablation path further comprises at least one of an ablation guide direction or an ablation path depth.

13. The method of claim 9, wherein determining the planned ablation path according to the fusion image comprises:
displaying an ablation device mark at a first position in the fusion image according to a relative position of an ablation device with respect to the ultrasound probe;
obtaining an adjustment instruction to the ablation device mark;
changing the first position of the ablation device mark in the fusion image to a second position according to the adjustment instruction; and
obtaining the planned ablation path according to the changed ablation device mark.

14. The method of claim 9, before determining the planned ablation path according to the fusion image, further comprising:
obtaining an ablation parameter of an ablation device, wherein the ablation parameter comprises at least one of an ablation power, a predicted working time and a number of ablation devices; and
obtaining the first predicted ablation area according to the ablation parameter, wherein the marked first predicted ablation area changes with a change of a position of an ablation device mark.

15. The method of claim 9, wherein displaying the real-time ultrasound image data and the view data of the target tissue comprises at least one of:
- displaying a three-dimensional view data and a two-dimensional real-time ultrasound image of the target tissue;
- displaying a three-dimensional view data and a three-dimensional real-time ultrasound image of the target tissue; or
- displaying a two-dimensional view data and a real-time ultrasound image of the target tissue.

16. The method of claim 10, wherein the method further comprises at least one of:
- displaying the first predicted ablation area following the ablation device mark on the fusion image;
- drawing a probe icon and marking the first predicted ablation area at a corresponding position in the fusion image; or
- marking an overlapping relationship between the first predicted ablation area and the second predicted ablation area according to the planned ablation path.

17. The method of claim 9, wherein determining the planned ablation path according to the fusion image comprises:
- importing a pre-stored planned ablation path into the fusion image;
- obtaining an input for changing the imported pre-stored planned ablation path based on a changed fusion image when a position of the ultrasound probe changes; and
- obtaining the planned ablation path according to the input.

18. An ultrasound system, comprising:
- an ultrasound probe;
- an ablation device fixed on the ultrasound probe;
- a transmitting circuit which excites the ultrasound probe to transmit an ultrasound beam to an examined object containing a target tissue;
- a receiving circuit which receives echoes of the ultrasound beam to obtain an ultrasound echo signal;
- a navigation system comprising a positioning device fixed on the ultrasound probe;
- a display screen;
- a memory storing a computer program; and
- a processor which, when executing the computer program:
- obtains real-time ultrasound image data of the examined object according to the ultrasound echo signal;
- obtains spatial orientation information of the positioning device through the navigation system;
- displays the real-time ultrasound image data on the display screen;
- obtains three-dimensional model data of the target tissue to obtain a view data of the target tissue;
- obtains an ablation path of the ablation device determined based on a fusion image that is obtained according to a mapping relationship between the three-dimensional model data and the real-time ultrasound image data, wherein the mapping relationship is obtained by registering the real-time ultrasound image data and the three-dimensional model data according to the spatial orientation information;
- obtains a pre-stored planned ablation path;
- displays the pre-stored planned ablation path and the obtained ablation path on a real-time ultrasound image rendered based on the real-time ultrasound image data and the view data; and
- calculates and quantifies an overlapping relationship between a predicted ablation area, of the pre-stored planned ablation path, covering the view data of the target tissue and an actual ablation area, of the ablation path, covering the view data of the target tissue; and
- outputs the quantified overlapping relationship.

19. The method of claim 9, further comprising obtaining a detection signal through an object positioning device attached to a surface of the examined object and correcting the spatial orientation information of the positioning device according to the detection signal.

20. The system of claim 1, wherein the processor further calculates a number of predicted ablation areas capable of covering the view data of the target tissue to determine a minimum number of ablation needles.

* * * * *